US012233956B2

(12) United States Patent
Dylewski, II et al.

(10) Patent No.: US 12,233,956 B2
(45) Date of Patent: Feb. 25, 2025

(54) TIRE CARRIER AND BEDSLIDE ATTACHMENT SYSTEMS

(71) Applicant: Truck Accessories Group, LLC, Elkhart, IN (US)

(72) Inventors: Eugene A. Dylewski, II, Granger, IN (US); John L. Aleva, Cassopolis, MI (US)

(73) Assignee: Leer Group, Elkhart, IN (US)

( * ) Notice: Subject to any disclaimer, the term of this patent is extended or adjusted under 35 U.S.C. 154(b) by 302 days.

(21) Appl. No.: 17/727,973

(22) Filed: Apr. 25, 2022

(65) Prior Publication Data

US 2022/0355870 A1 Nov. 10, 2022

Related U.S. Application Data

(60) Provisional application No. 63/185,001, filed on May 6, 2021.

(51) Int. Cl.
*B62D 43/02* (2006.01)
*B62D 33/037* (2006.01)
*B62D 43/00* (2006.01)

(52) U.S. Cl.
CPC ......... *B62D 33/037* (2013.01); *B62D 43/002* (2013.01); *B62D 43/02* (2013.01)

(58) Field of Classification Search
CPC ...... B62D 43/00; B62D 43/002; B62D 43/02; B62D 33/0207
USPC ..... 296/37.2; 224/42.21, 42.28, 42.26, 42.24
See application file for complete search history.

(56) References Cited

U.S. PATENT DOCUMENTS

| | | | |
|---|---|---|---|
| 3,448,904 A | 6/1969 | Sahr | |
| 4,140,255 A * | 2/1979 | Weiler | B62D 43/02 224/536 |
| 4,410,117 A | 10/1983 | Crawford et al. | |
| 4,485,945 A * | 12/1984 | Ankeny | B62D 43/02 414/463 |
| 5,186,371 A * | 2/1993 | Jozefczak | B62D 43/002 414/463 |
| 5,333,766 A * | 8/1994 | Fisher | B62D 43/02 224/42.28 |

(Continued)

FOREIGN PATENT DOCUMENTS

| CN | 111924017 A | 11/2020 |
|---|---|---|
| CN | 212473701 U | 2/2021 |

(Continued)

OTHER PUBLICATIONS

International Search & Written Opinion; Date of Mailing Jul. 26, 2022; PCT/US2022/026494; Truck Accessories Group, LLC.

(Continued)

*Primary Examiner* — Gregory A Blankenship
(74) *Attorney, Agent, or Firm* — Barnes & Thornburg LLP

(57) ABSTRACT

A modular accessory attachment system for a tire carrier, a bike rack, container, or other structure that can be selectively attached to either a bedslide, cargo box bed, or tailgate hitch, is provided. The modular accessory attachment system may include a plurality of receivers disposed through the deck of the bedslide. Correspondingly sized posts may be extend from the tire carrier, bike rack, other racks, or accessories, and be disposed into the receivers. Pins, detents, or other like attachment means may be employed to secure the posts to the receivers.

17 Claims, 38 Drawing Sheets

(56) References Cited

U.S. PATENT DOCUMENTS

| | | | | |
|---|---|---|---|---|
| 5,469,998 | A * | 11/1995 | Van Dusen | B60D 1/52 |
| | | | | 224/535 |
| 5,730,338 | A * | 3/1998 | Travis | B62D 43/02 |
| | | | | 224/42.32 |
| 6,189,748 | B1 * | 2/2001 | Hutter | B62D 43/002 |
| | | | | 224/42.28 |
| 6,761,293 | B2 * | 7/2004 | Vasseur | B62D 43/08 |
| | | | | 414/463 |
| 6,796,466 | B2 | 9/2004 | Essig | |
| 7,021,685 | B2 * | 4/2006 | Newbill | B62D 43/02 |
| | | | | 296/37.2 |
| 7,845,895 | B2 | 12/2010 | Barie et al. | |
| 7,861,902 | B2 | 1/2011 | Osenkowski | |
| 8,528,800 | B1 * | 9/2013 | Newbill | B62D 43/02 |
| | | | | 224/512 |
| 8,540,125 | B2 | 9/2013 | Newbill | |
| 9,227,547 | B2 | 1/2016 | Williams | |
| 9,828,045 | B1 * | 11/2017 | Harris | B62D 43/002 |
| 10,479,284 | B1 * | 11/2019 | Salyer | B60R 9/06 |
| 10,858,050 | B2 | 12/2020 | Headlee | |
| 10,899,399 | B1 | 1/2021 | Yang | |
| 11,440,459 | B1 | 9/2022 | Nunn | |
| 2002/0180231 | A1 | 12/2002 | Fox | |
| 2008/0308588 | A1 * | 12/2008 | Smith | B62D 43/02 |
| | | | | 224/42.24 |
| 2009/0120976 | A1 | 5/2009 | Mackarvich | |
| 2013/0049394 | A1 * | 2/2013 | Urano | B62D 43/08 |
| | | | | 296/193.07 |
| 2013/0221042 | A1 | 8/2013 | Fortner | |
| 2017/0174273 | A1 * | 6/2017 | Burton | B62D 43/02 |
| 2018/0118077 | A1 | 5/2018 | Ferkul et al. | |
| 2018/0118283 | A1 | 5/2018 | Gutierrez | |
| 2019/0054963 | A1 * | 2/2019 | Cassell | B60R 9/06 |
| 2019/0241222 | A1 * | 8/2019 | Favero | B62D 43/02 |
| 2020/0039588 | A1 | 2/2020 | Standifer | |
| 2020/0406986 | A1 | 12/2020 | Sosnowich et al. | |
| 2021/0129925 | A1 * | 5/2021 | Ackerman | B62D 43/02 |
| 2022/0355870 | A1 * | 11/2022 | Dylewski, II | B62D 43/02 |
| 2023/0173858 | A1 * | 6/2023 | Liwanag | B62D 43/02 |
| | | | | 224/42.21 |

FOREIGN PATENT DOCUMENTS

| | | |
|---|---|---|
| GB | 2578736 A | 5/2020 |
| JP | 07257440 A | 10/1995 |
| JP | 08133139 A | 5/1996 |
| JP | 0958534 A | 3/1997 |
| JP | 09058534 A | 3/1997 |
| JP | 2568786 Y2 | 4/1998 |
| JP | 2585955 Y2 | 11/1998 |
| JP | 2597103 Y2 | 6/1999 |
| JP | 2600825 Y2 | 10/1999 |
| KR | 20080023040 A | 3/2008 |
| KR | 1020080023040 A | 3/2008 |
| KR | 20080051860 A | 6/2008 |
| KR | 1020080051860 A | 6/2008 |
| KR | 101558481 B1 | 10/2015 |
| WO | 2004082993 A1 | 9/2004 |
| WO | 2011125172 A1 | 10/2011 |

OTHER PUBLICATIONS

International Search & Written Opinion; Date of Mailing May 6, 2024; PCT/US2024/12555; Leer Group; "Bedslide No Drill Mounting Bracket".

Extended European Search Report Dated Nov. 14, 2023; Application No. EP 20881050.7-1009 / 4051540 PCT/US2020058128.

* cited by examiner

TIRE CARRIER AND BEDSLIDE ATTACHMENT SYSTEMS

RELATED APPLICATIONS

The present application relates to and claims priority to U.S. Provisional Patent Application, Ser. No. 63/185,001, filed on May 6, 2021. The subject matter disclosed in that provisional application is hereby expressly incorporated into the present application.

TECHNICAL FIELD AND SUMMARY

The present disclosure relates to pickup truck accessories and bedslides, and, particularly, to tire carriers and racks that can be held via accessory attachment systems used on bedslides attached to pickup truck cargo boxes.

An embodiment of the present disclosure relates to a tire carrier coupled to a bedslide that is attached to the bed of a cargo box. The tire carrier is configured to hold a spare tire. Another embodiment includes a folding tire carrier that can selectively hold a spare tire in either a vertical or horizontal position depending on how an operator orients the carrier. The operator may fold the carrier upward so the tire is held in place in a vertical orientation, or fold the carrier downward so the spare tire is held in a horizontal orientation. In the latter configuration, the spare tire may be positioned below the top surface of the cargo box sidewalls, allowing a tonneau cover to fit over top and shroud the top cargo box opening.

Another illustrative embodiment includes a racking system, such as a bike rack, that can be selectively attached to either a bedslide or a tailgate hitch (under the cargo box of the pickup truck). To that end, another illustrative embodiment includes a modular accessory attachment system for the bedslide. The attachment system may include a plurality of receivers disposed through the deck of the bedslide. Correspondingly sized posts may be extend from the tire carriers, bike rack, other racks, or accessories, and be disposed into the receivers on the bedslide deck. Pins, detents, or other like attachment means may be employed to secure the posts to the receivers. In a further illustrative embodiment, the receivers may be sized similar to that of the tailgate hitch located under the pickup truck cargo box so that the carriers, racks, etc., can be alternately attached to either the bedslide deck receiver or the hitch. This adds further utility and versatility to these truck accessories.

An illustrative embodiment of the present disclosure provides a tire carrier assembly. The tire carrier assembly includes a tire carrier support bracket and a base bracket. At least one pivot pin is disposed through the base bracket and the tire carrier support bracket to allow the tire carrier support bracket to pivot between upright and laid flat positions with respect to the base bracket. A tire carrier is attached to the tire carrier support bracket. The tire carrier includes: a first sidewall panel and a second sidewall panel at least a portion of which is spaced apart from the first sidewall panel; a rim panel located between the first sidewall panel and the second sidewall panel; a support panel located between the first sidewall panel and the second sidewall panel and adjacent the rim panel; and at least one lug attached to the rim panel. At least one foot member extends transverse from the tire carrier support bracket. A lock pin is selectively extendable through the base bracket and the tire carrier support bracket to prevent the tire carrier support bracket from moving between upright and laid flat positions unless the lock pin is removed from at least the tire carrier support bracket. A secondary lock fastener is selectively extendable through the base bracket and the at least one foot member to prevent the tire carrier support bracket from moving from its upright position and is selectively extendable through the base bracket and the tire carrier support bracket to prevent the tire carrier support bracket from moving from its laid flat position.

In the above and other illustrative embodiments, the present disclosure may further comprise: a bail coupled to the lock pin to assist in selectively securing the lock pin with the base bracket and the tire carrier support bracket; a spring in engagement with the at least one pivot pin to bias the tire carrier support bracket to its upright position; a receiver post that extends from the base bracket; at least one bushing surrounding at least a portion of the at least one pivot pin; the secondary lock fastener being a threaded fastener to selectively engage a corresponding threaded bore located in a structure selected from the group consisting of the at least one foot member and the tire carrier support bracket; the secondary lock fastener being disposed through a first opening in the base bracket when engaged with the corresponding threaded bore located in the at least one foot member or is disposed through a second opening in the base bracket spaced apart from the first opening in the base bracket when engaged with the corresponding threaded bore located in the tire carrier support bracket; the tire carrier support bracket including a first leg member and a second leg member a portion of which is spaced apart from the first leg member; the at least one foot member extending from the first leg member of the tire carrier support bracket and a second foot member extending transversely from the second leg member; the tire carrier being selectively detachable from the tire carrier support bracket; and a second pivot pin that engages the base bracket and the second leg member of the tire carrier support bracket.

Another illustrative embodiment of the present disclosure also provides a tire carrier assembly. The tire carrier assembly includes a tire carrier support bracket and a base bracket. At least one pivot pin is disposed through the base bracket and the tire carrier support bracket to allow the tire carrier support bracket to move with respect to the base bracket. A tire carrier is attached to the tire carrier support bracket. A lock pin that is selectively extendable through the base bracket and the tire carrier support bracket to prevent the tire carrier support bracket from moving unless the lock pin is removed from at least the tire carrier support bracket.

In the above and other illustrative embodiments, the present disclosure may further comprise: at least one foot member that extends transverse from the tire carrier support bracket; a secondary lock fastener that is selectively extendable through the base bracket and the at least one foot member to prevent the tire carrier support bracket from moving; a secondary lock fastener that is selectively extendable through the base bracket and the tire carrier support bracket to prevent the tire carrier support bracket from moving; the secondary lock fastener being disposed through a first opening in the base bracket when engaged with a first corresponding threaded bore located in the at least one foot member; the at least one pivot pin being disposed through the base bracket and the tire carrier support bracket to allow the tire carrier support bracket to pivot between upright and laid flat positions with respect to the base bracket; and the tire carrier including: a first sidewall panel and a second sidewall panel at least a portion of which is spaced apart from the first sidewall panel, a rim panel located between the first sidewall panel and the second sidewall panel, a support panel located between the first sidewall panel and the second sidewall panel and adjacent the rim panel, and at least one lug attached to the rim panel.

Another illustrative embodiment of the present disclosure includes a tire carrier assembly. The tire carrier assembly includes a tire carrier support bracket and a base bracket. The tire carrier support bracket is movable with respect to the base bracket. A tire carrier is attached to the tire carrier support bracket. A receiver post extends from the base bracket.

In the above and other illustrative embodiments, the present disclosure may further comprise a receiver post that is sized to fit in a receiver disposed through a bedslide deck.

Additional features and advantages of these attachment assemblies will become apparent to those skilled in the art upon consideration of the following detailed descriptions exemplifying embodiments of carrying out the attachment assemblies as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of the attachment assemblies and such exemplification is not to be construed as limiting the scope attachment assemblies in any manner.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Tire Carrier

An illustrative embodiment of a tire carrier of this disclosure includes a generally triangularly-shaped bracket having a wider base at the bottom and narrower rim support panel at the top. A support panel spans between inwardly-angled sidewalls between the base and rim support panel. In an illustrative embodiment, a portion of the base extends from each sidewall. Bolt holes are disposed through each base portion to be fastened onto the deck of a bedslide. In another illustrative embodiment, one or more attachment posts may extend from the tire carrier and fitted into one or more corresponding receivers disposed through the deck of the bedslide. These two attachment options allow flexibility with attaching to the deck of the bedslide or the bed surface of a cargo box.

Illustratively, on the rim support panel, one or more lugs may extend therefrom to engage corresponding openings in the rim of the spare tire. Nuts or other fastening structures may be employed to secure the rim onto the rim support panel via the lugs. Having the tire carrier attached to the deck of the bedslide allows convenient access to the spare tire. Also, in this embodiment, with the tire carrier oriented to hold the spare tire in a horizontal position, the spare tire remains low enough within the cargo box to allow a tonneau cover to be used to shroud the cargo box opening at the top of the cargo box sidewalls.

Figure 1:
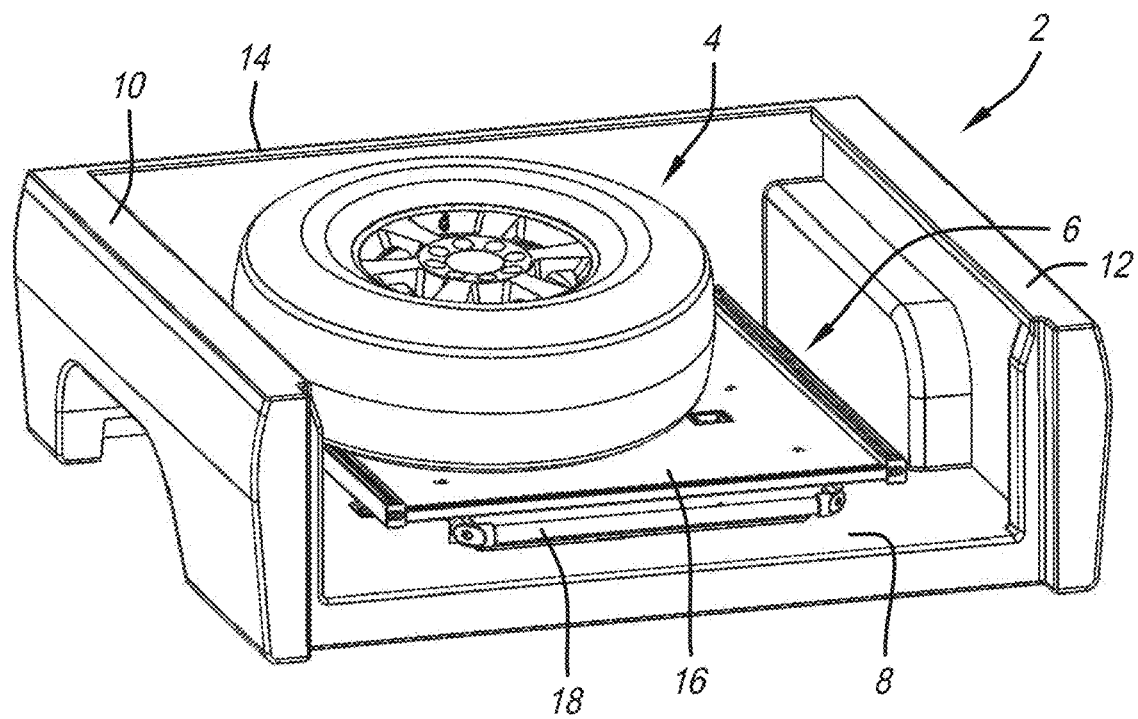
FIG. 1 is a perspective view of a cargo box with a tire carrier supporting a tire located on a bedslide with the bedslide located in a retracted stowed position.

A perspective view of a cargo box 2 with a tire carrier (see FIG. 3) supporting a tire 4 on a bedslide 6 is shown in FIG. 1. Bedslide 6 is located in cargo box 2 at its retracted stow position. Cargo box 2 includes bed 8 with opposed sidewalls 10 and 12 extending upwardly there from. A bulkhead 14 extends from sidewall 10 to sidewall 12 at the front of cargo box 2. As demonstrated in this view, tire 4 lies flat to allow a tonneau cover to sit over the top opening of the cargo box without the tire 4 interfering. Bedslide 6 includes a deck 16 with an attached handle 18 that can push and pull bedslide 6 to and from bed 8 of cargo box 2.

Figure 2:
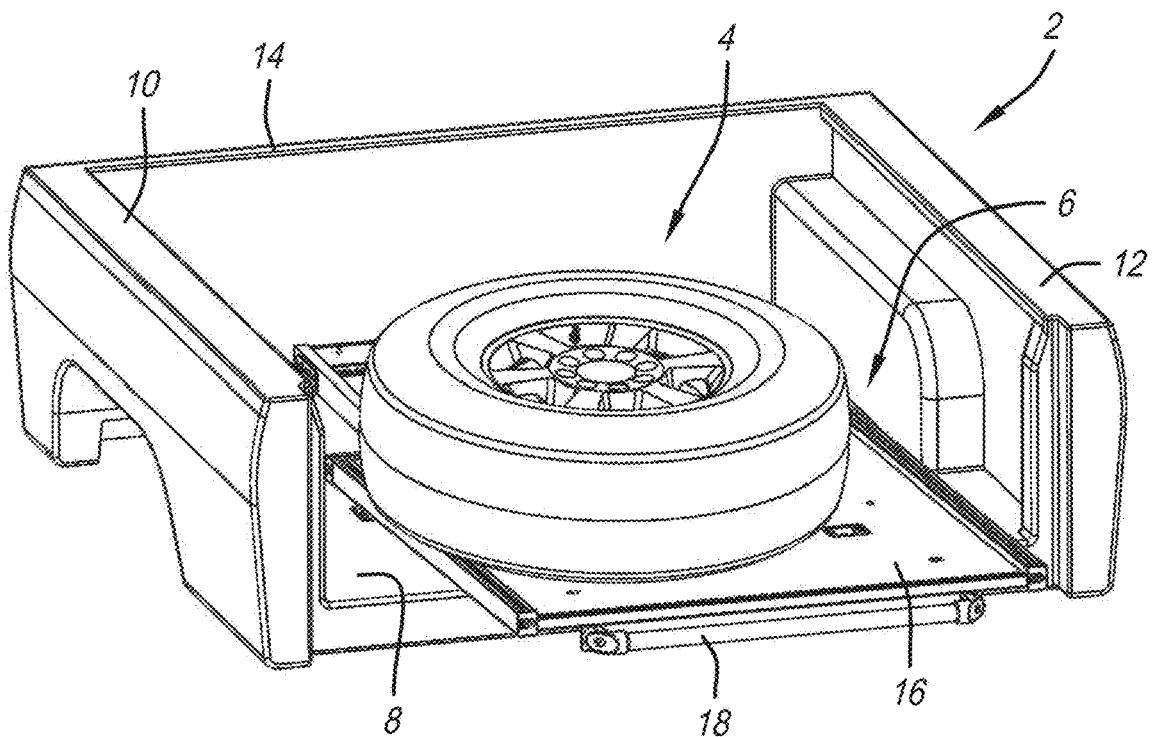
FIG. 2 is a perspective view of the cargo box with the tire carrier located on the bedslide in an extended use position.

Another perspective view of cargo box 2 with a tire carrier (see FIG. 3) supporting tire 4 located on bedslide 6 pulled to its extended use position with respect to cargo box 6 is shown in FIG. 2. This view illustrates how tire 4 can be accessed on bedslide 6 when extended to this use position. Again, tire 4 is secured in a horizontal orientation with respect to the bedslide while it's still allowing covering, such as a tonneau cover, to be located over the cargo box.

Figure 3:
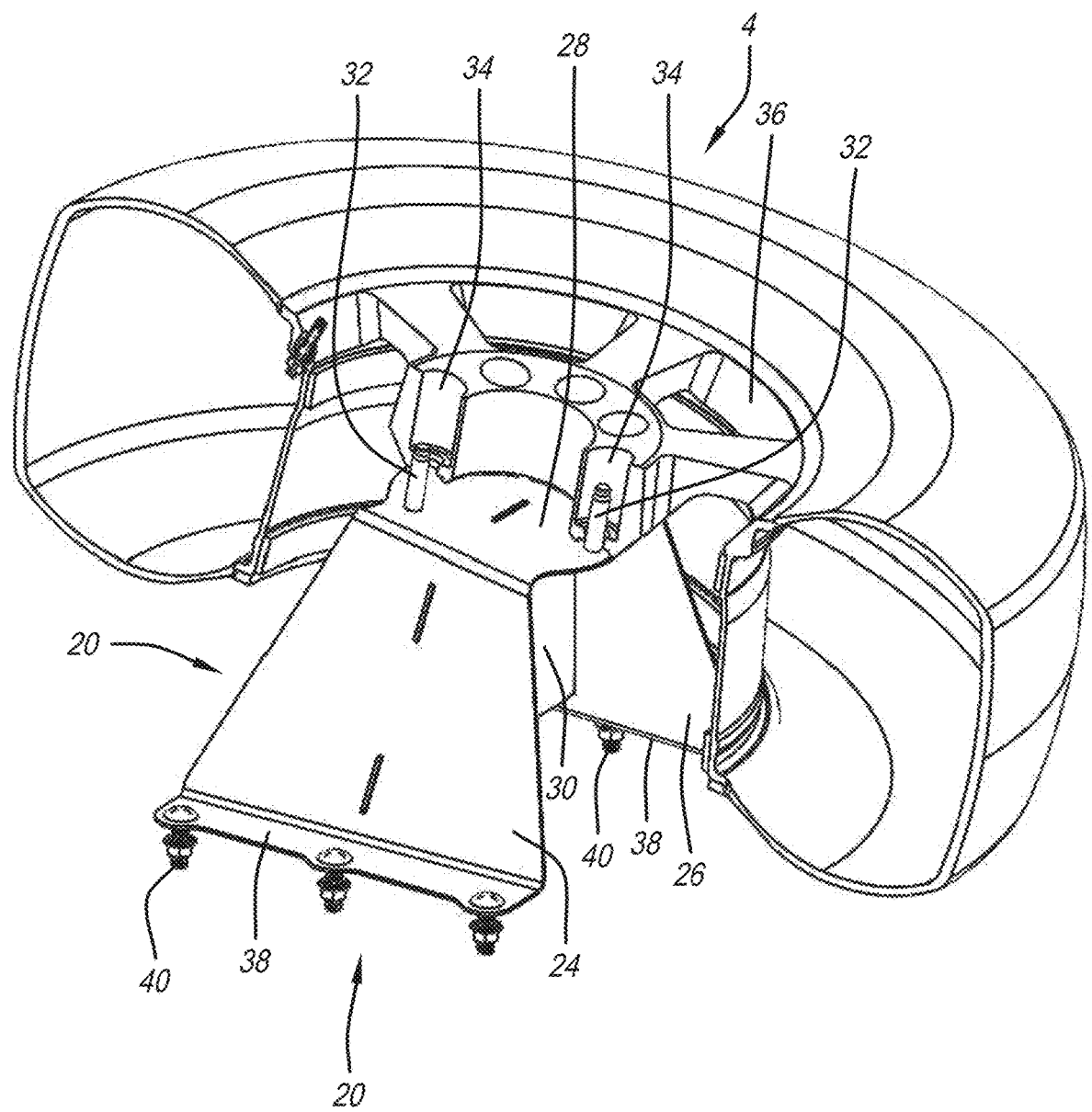
FIG. 3 is a perspective view of a tire carrier with a cross-sectional view of a tire located thereon.

In order to secure tire 4 to bedslide 6, a tire carrier 20 is secured thereto. A perspective view of tire carrier 20 with a cross-sectional view of tire 4 located thereon is shown in FIG. 3. Tire carrier 20 includes a support bracket 22 composed of upwardly extending and spaced apart sidewall panels 24 and 26 with a rim support panel 28 spanning therebetween as illustratively shown. A support panel 30 extends between sidewall panels 24 and 26, as well as underneath rim support panel 28. One or more lugs 32 may be positioned on rim support panel 28 and extend therefrom. Lugs 32 are positioned so as to extend in bores 34 of rim 36 to secure tire 4 to tire carrier 20. In this illustrative embodiment, a base flange 38 may extend from each of sidewall panels 24 and 26. Bolts or other like fasteners may extend through base flange 38 for purposes of securing directly to deck 16 of bedslide 6 or even bed 8 of cargo box 2.

Figure 4:
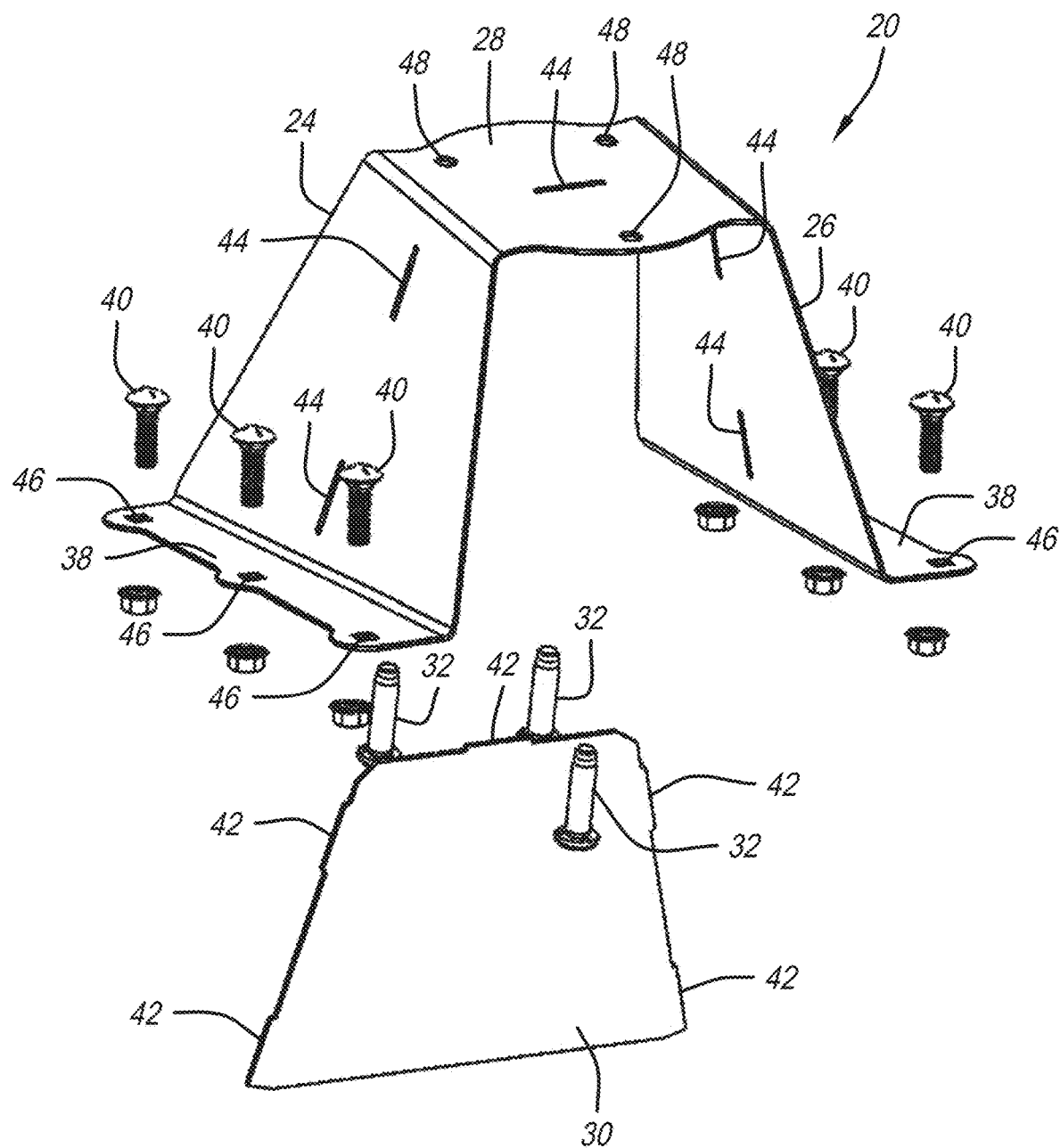
FIG. 4 is a perspective exploded view of the tire carrier.

A perspective exploded view of tire carrier 20 is shown in FIG. 4. Sidewall panels 24 and 26 are shown extending upwardly at a transverse angle with respect to rim support panel 28 extending therebetween. It is appreciated that sidewall panels 24 and 26 may, in addition to the angle shown, extend orthogonally, or at some other angle with respect to rim support panel 28. This view also shows support panel 30 that can be fitted between sidewall panels 24 and 26 and be positioned underneath rim support panel 28. In this illustrative embodiment, support panel 30 includes a plurality of outwardly extending tabs 42 configured to fit into corresponding slots 44 on sidewall panels 24 and 26, as well as rim support panel 28. This configuration creates a straight forward construction method for tire carrier 20. It is appreciated, however, that other mechanisms may be employed to secure support panel 30 to tire carrier 20 including welding, fasteners, and other like fastening means. In addition, the illustrative embodiment of sidewall panels 24, 26, and rim support panel 28 is a single panel of sheet-metal stamped or bent into the desired form. However, it is contemplated that other methods of manufacturing sidewall panels and rim support panels may be employed, such as separate sheets being welded or fastened together. The method of construction of the structures that compose tire carrier 20 may vary depending on the need.

Further shown in this view are base flanges 38 extending from sidewall panels 24 and 26, respectively. Bolt holes 46 extend through base flanges 38 for purposes of receiving bolts 40. It is appreciated that other fastening means may be employed to connect tire carrier 20 to bedslide deck 16 or bed 8. Such attachment means may include attachment posts configured to extend into receivers as further described in the present disclosure, slotted brackets that the flanges may fit into securing the tire carrier, or other like securement means. Further shown herein are lugs 32 that extend through holes 48 disposed through rim support panel 28. Again, the positioning of the lugs shown herein is illustrative and can be configured as needed based on the configuration of the bores extending through a tire rim.

Figure 5:
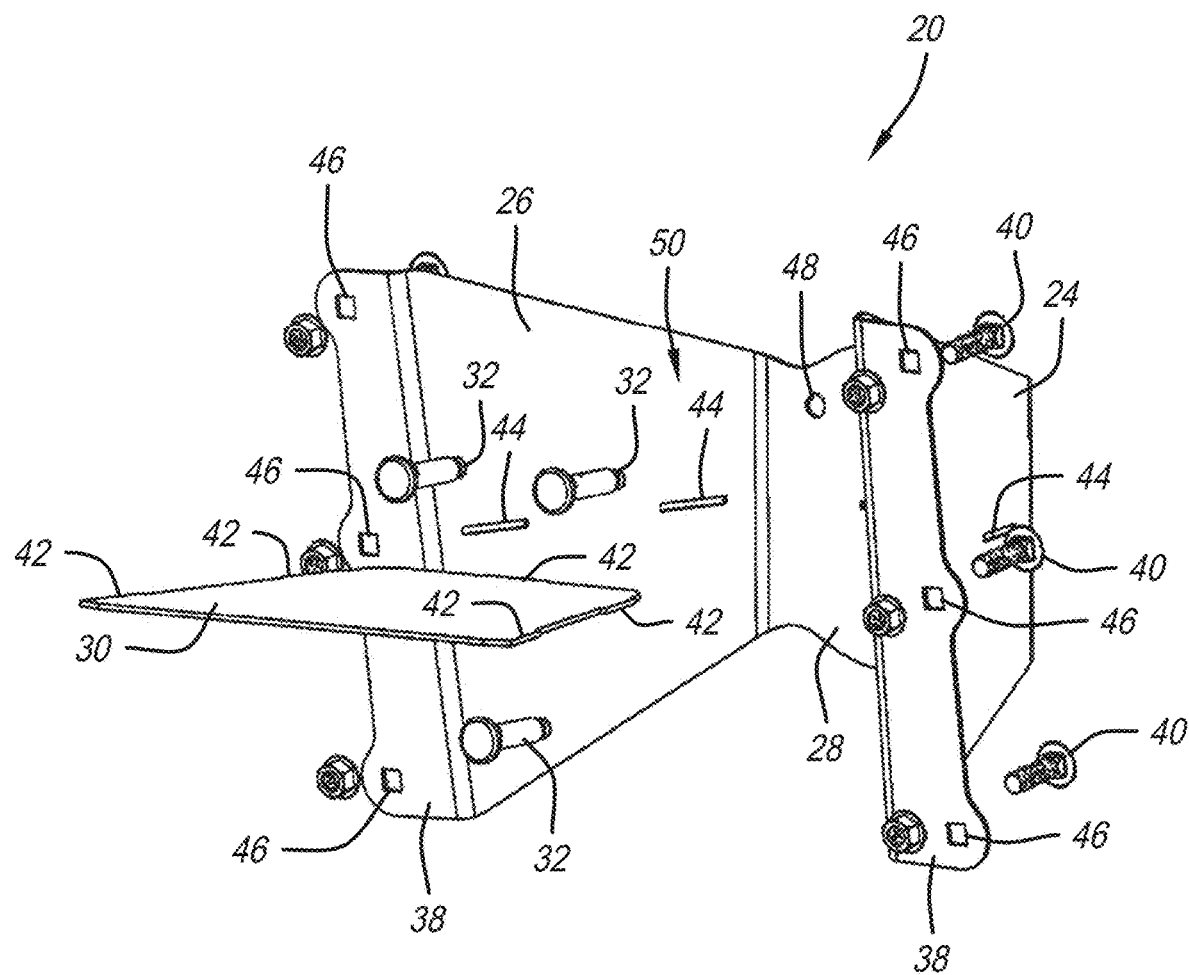
FIG. 5 is an underside perspective exploded view of the tire carrier.

An underside perspective exploded view of tire carrier 20 is shown in FIG. 5. This view further shows how support panel 30 may be extended between sidewall panels 24 and 26 and up against rim support panel 28. Space 50 located between sidewall panels 24 and 26 is sized so that support panel 30 may fit therein to provide rigidity to tire carrier 20. This view further shows base flanges 38 extending from each of sidewall panels 24 and 26 along with bolt holes 46 sized to receive bolts 40. This view also shows tabs 42 extending from support panel 30 to fit into slots 44 to secure support panel 30 to sidewall panels 24 and 26, as well as rim support panel 28.

Folding Tire Carrier

Another illustrative embodiment of the present disclosure provides a folding tire carrier that may be secured to either a bedslide or to the bed surface of the cargo box. Having the option of accessing the spare tire in either a vertical or horizontal position creates flexibility for the operator. Furthermore, by pivoting the folding tire carrier downwardly so the spare tire is positioned horizontal on the bedslide or cargo box bed, the spare tire does not interfere with a tonneau cover that can shroud the cargo box's top opening. In other instances, it may be more convenient for the operator to access the spare tire while it is positioned vertically. In one illustrative embodiment, the folding spare tire carrier is coupled to a bedslide that is recessed within the cargo box or extended from the cargo box. It is appreciated from these views that an operator may simply pull the bedslide from the cargo box and then detach the spare tire from the folding tire carrier while the spare tire is oriented vertically. Additionally, having an extension post depending from the folding tire carrier allows the folding tire carrier to be positioned in any myriad of locations on a bedslide equipped with corresponding receivers. As such, the operator has a variety of options on both where to position the folding tire carrier within the cargo box, as well as how to position the spare tire itself, either vertically or horizontally.

A tire carrier support bracket may terminate at extending feet or tire supports. A tire carrier, similar to the prior embodiment may be attached to the tire carrier support bracket using fasteners. The base of the tire carrier may differ from the prior embodiment in that its base may include slotted fastener openings to allow the tire carrier to be secured to the tire carrier support bracket in an adjustable manner. The tire carrier bracket base may be moved vertically along the plurality of bolts, to secure the tire carrier at different heights along the tire carrier support bracket.

Pivot pins may be disposed through the tire carrier support bracket and a base bracket to create a pivot point for the tire carrier support bracket for pivoting same between horizontal and vertical positions. Bushings and one or more springs may be disposed about the pivot pins to both eliminate metal to metal contact between the pins and the tire carrier support and base brackets and create a biasing lift assist when moving the tire carrier support bracket from its horizontal to vertical position. A lock pin with an illustrative snap lock bail may be disposed through both the base and tire carrier support brackets to secure the tire carrier support bracket in a vertical orientation. Additionally, the lock pin may be disposed through the base bracket and the tire support to secure the tire carrier support bracket in its horizontal orientation.

A knobbed fastener may be disposed through both the base and tire carrier support brackets and independently threaded into bushings located in both the tire carrier support bracket and the tire support. The knobbed fastener may be a secondary securement that draws the components together when vertically or horizontally oriented to prevent the folding tire carrier from rattling while the pickup truck is in motion. A spacer bracket is positioned within the base bracket to provide support to the pivot pins. A post may be attached to, and extend from, the base bracket to be inserted into a receiver in a bedslide deck or other structure configured with an appropriate receiver. A securement pin may be disposed through the post to secure it, along with the folding tire carrier to the bedslide or other structure configured with the appropriate receiver.

Illustratively, pivot pins may extend through the base bracket, tire carrier support bracket, and spacer bracket. The spring is illustratively disposed about the pivot pin. Again, the spring assists in moving the tire carrier support bracket from its lowered horizontal position to its upright vertical position. The post may extend through the base bracket for purposes of connecting to a corresponding receiver in the deck of a bedslide or bed of a cargo box. The knobbed fastener may also be disposed through the base panel and into the support bracket. A threaded bushing is fitted into the support bracket to receive the knobbed fastener, which can be tightened to reduce rattling between components of the folding tire carrier.

When the tire carrier support bracket is upright in its vertical orientation, the knobbed fastener is extended through the base bracket and into one of the tire supports. It is appreciated that corresponding holes, bushings, etc. can be disposed through both sides of the base, tire carrier support, and spacer brackets, as well as tire supports, so that said pivot pins and knobbed fasteners may be disposed on either side, or both sides, of the floating tire carrier.

When the support bracket is located in its horizontal position, the pivot pin is disposed through the base bracket, tire carrier support bracket, and spacer bracket. The pivot pin is also disposed through bushings to support the pin and prevent metal on metal contact between the support bracket and the pin. An illustrative snap ring may hold the pin onto the spacer bracket. Also, the spring is illustratively wound around the pivot pin for purposes of biasing the tire carrier support bracket towards its upright vertical position. This assists the operator with moving the support bracket from its lowered horizontal position to its upper vertical position.

When the folding tire carrier is attached to the bed of the cargo box rather than a bedslide, the base bracket may be held onto the cargo box bed with fasteners. Regardless of the means of attachment, however, the folding tire carrier may pivot either downward or upward so the spare tire rests on the bed either horizontally or vertically. Also, when the spare tire is stored horizontally, a tonneau cover may be used to cover the top opening of the cargo box.

Figure 6:
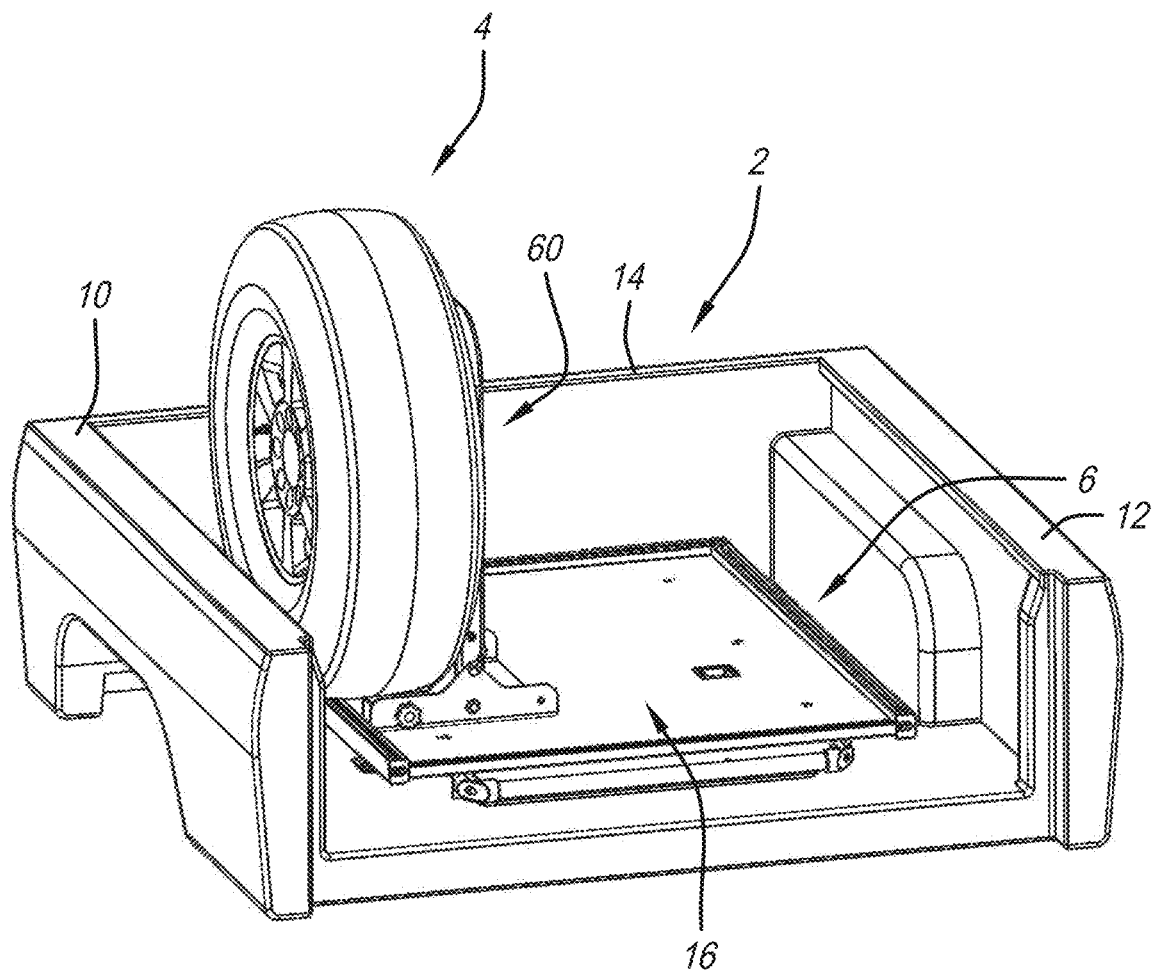
FIG. 6 is a perspective view of the cargo box with a folding tire carrier located in an upright position on the bedslide with the bedslide located in its retracted stowed position.

A perspective view of cargo box 2, with a folding tire carrier assembly 60 located in an upright position on deck 16 of bedslide 6 retracted in cargo box 2, is shown in FIG. 6. When folding tire carrier assembly 60 is positioned upright in this illustrative embodiment, so too is tire 4. Illustratively folding tire carrier assembly 60 and tire 4 sit partially above sidewalls 10 and 12, as well as bulkhead 14.

Figure 7:
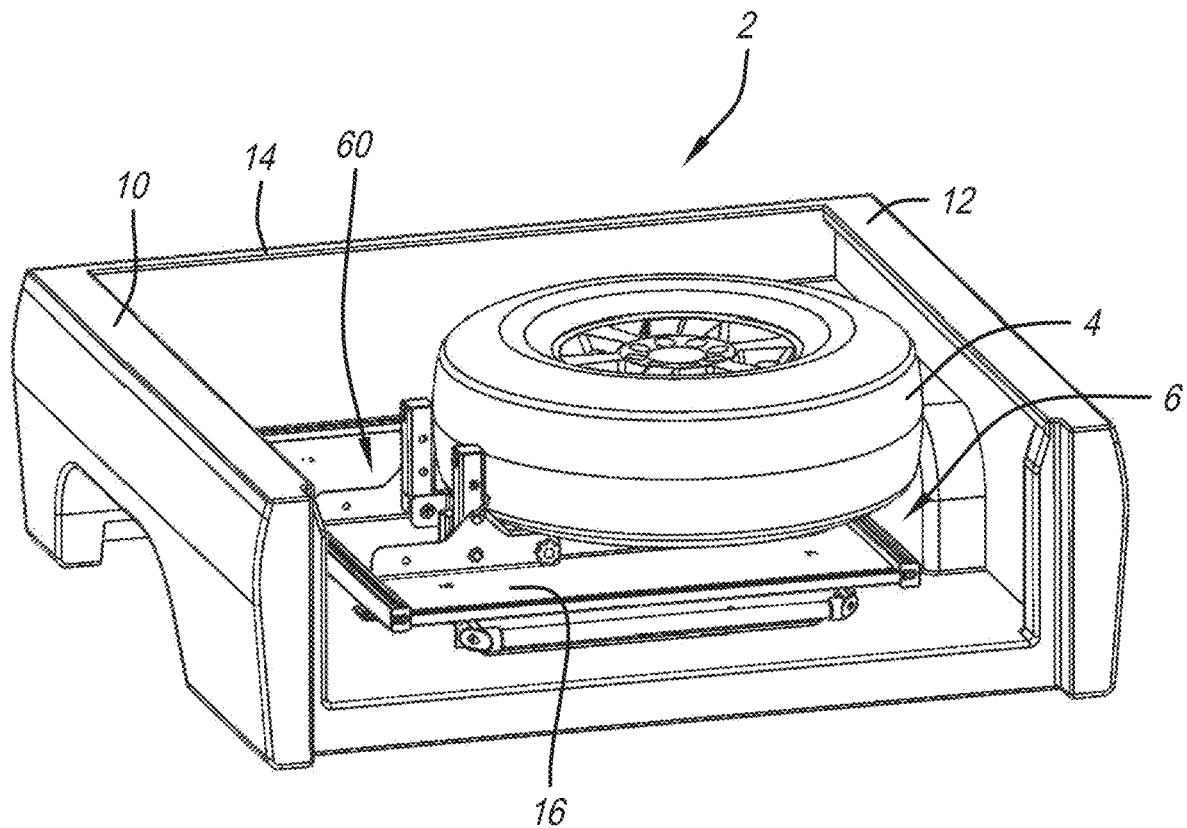
FIG. 7 is another perspective view of the cargo box in its retracted position with the folding tire carrier attached thereto and laid flat thereon.

Another perspective view of cargo box 2, with folding tire carrier 60 coupled to deck 16 of bedslide 6, is shown in FIG. 7. In this view, however, folding tire carrier assembly 60 is positioned so tire 4 is laid flat with respect to deck 16 of bedslide 6 within cargo box 2. In this position, both folding tire cover assembly 60 and tire 4 do not extend above cargo box sidewalls 10 and 12 nor bulkhead 14. Hence, a tonneau cover or other covering for cargo box 2 may be employed without tire 4 obstructing such use.

Figure 8:
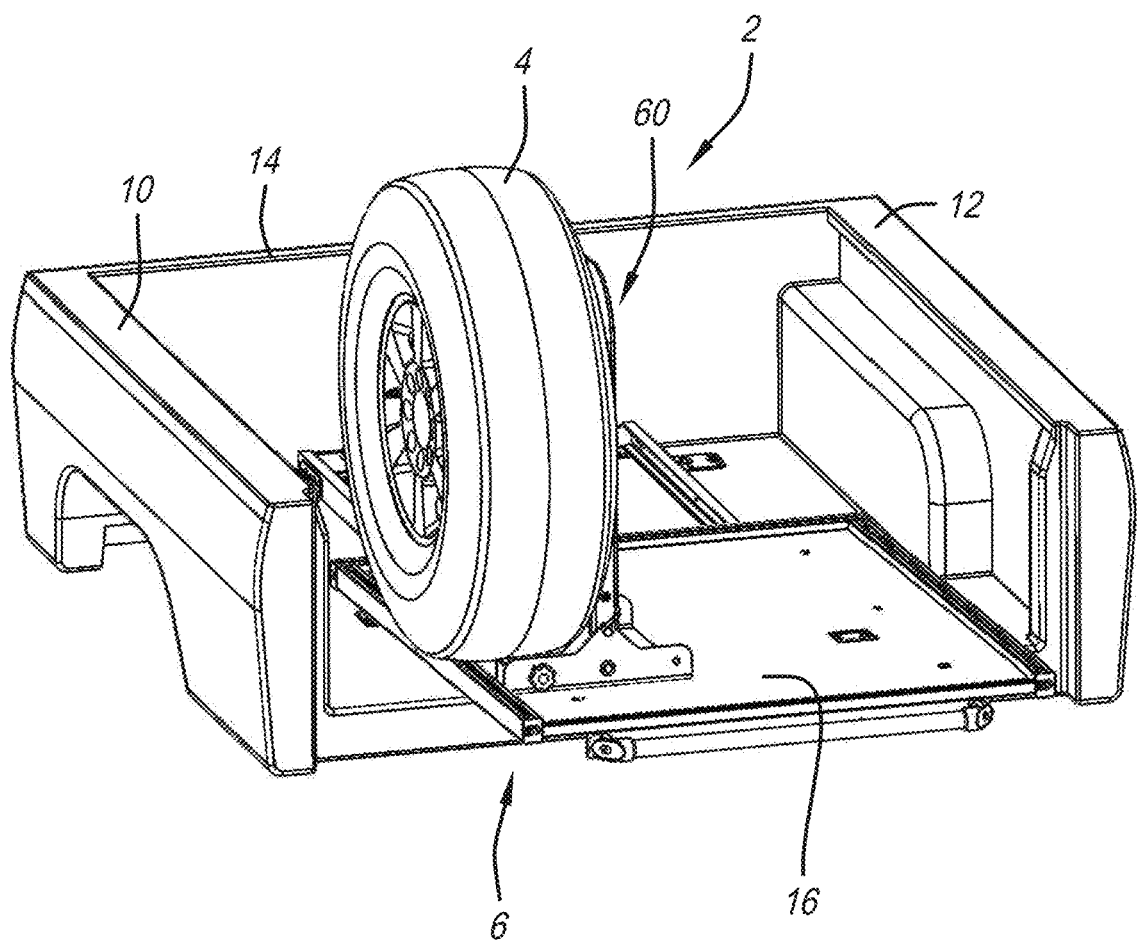
FIG. 8 is a perspective view of the cargo box with the folding tire carrier located in its upright position on the bedslide extended to its use position.
Figure 9:
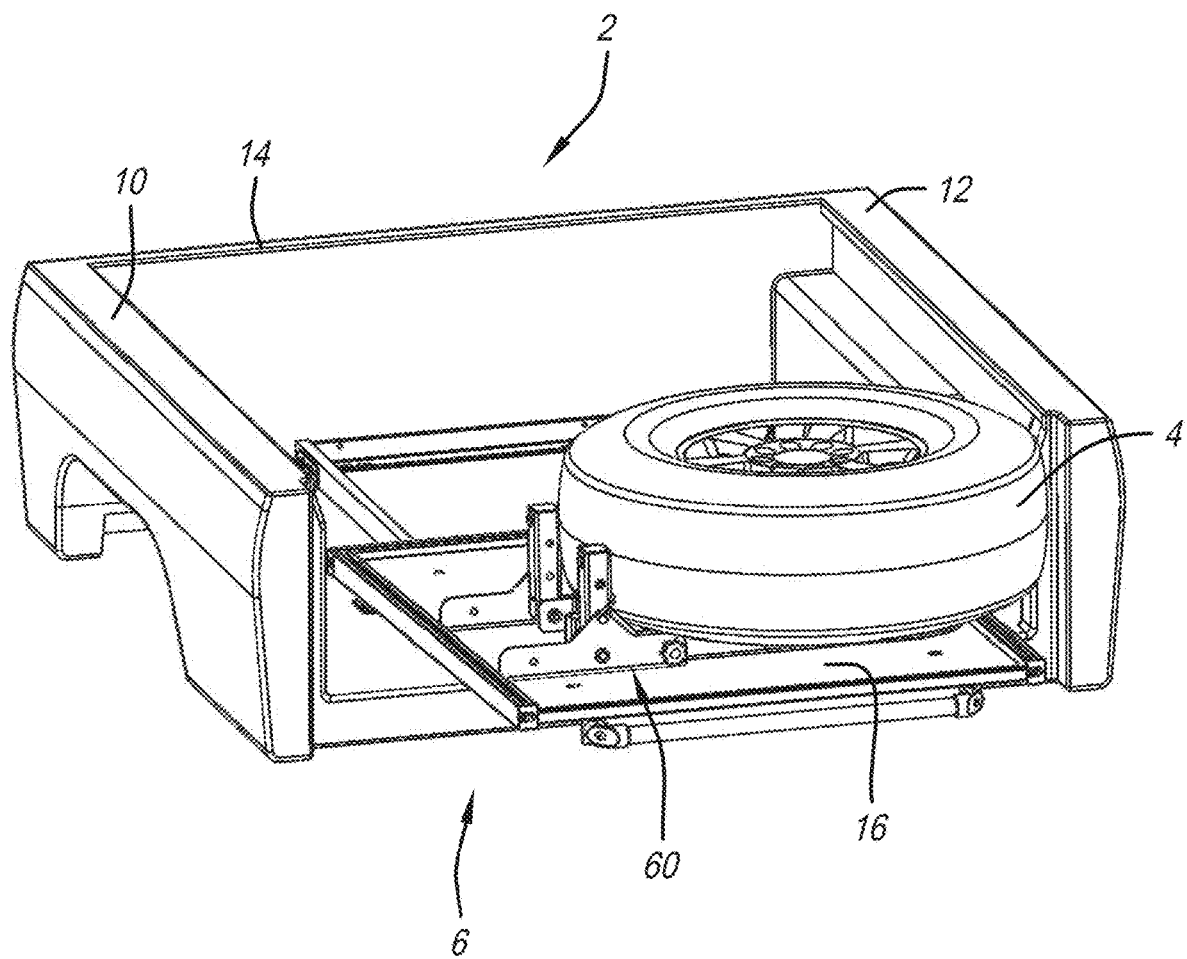
FIG. 9 is another perspective view of the cargo box with the bedslide located in its extended use position and the folding tire carrier attached thereto and located in its laid flat position.

The perspective use of cargo box 2 shown in both FIGS. 8 and 9 are similar to those shown in FIGS. 6 and 7, respectively, except that bedslide 6 is extended with respect to cargo box 2. The view in FIG. 8 shows folding tire cover assembly 60 positioned in its upright position. In contrast, the view in FIG. 9 shows folding tire carrier assembly 60 located in its downward laid flat position.

Figure 10:
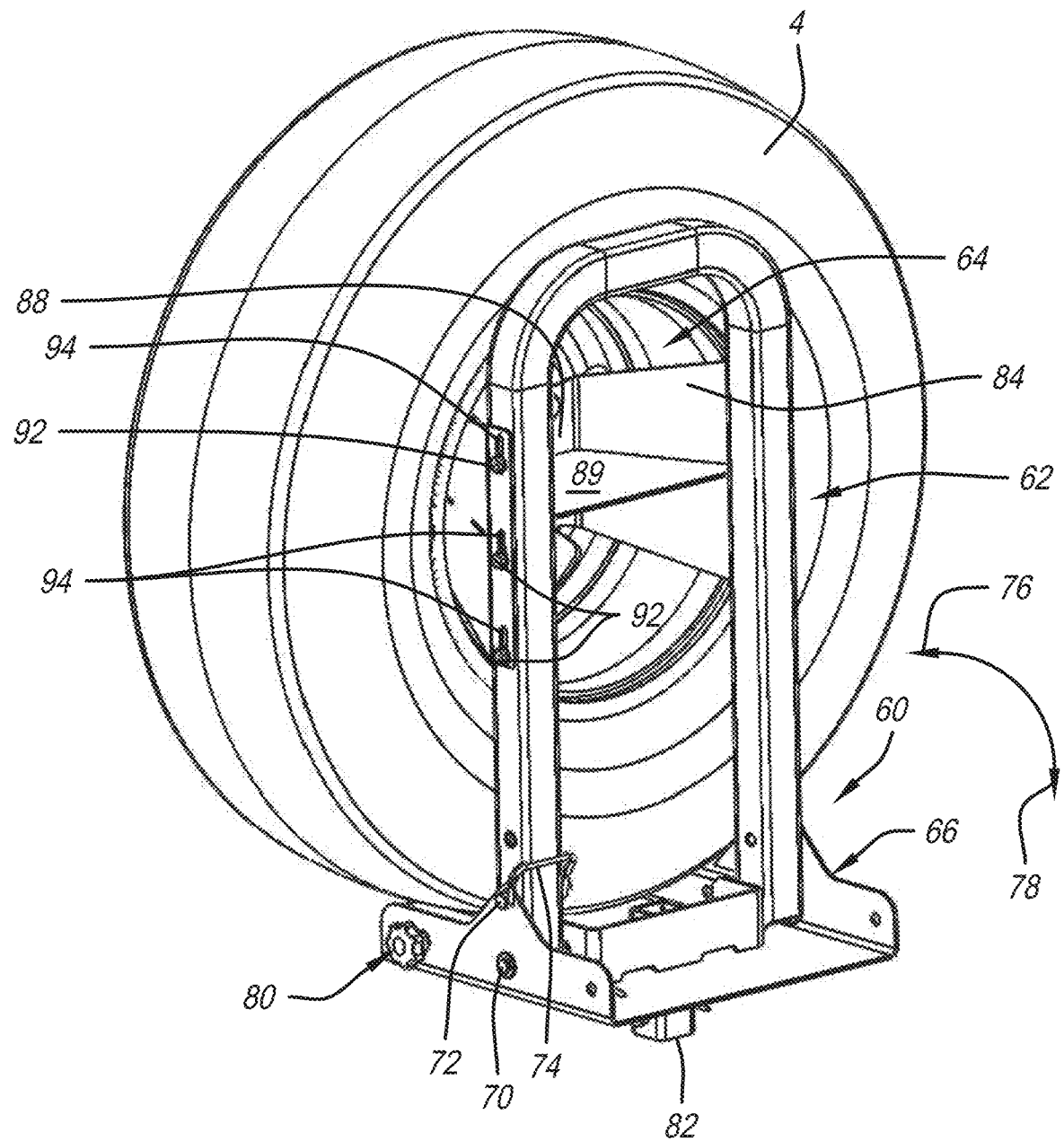
FIG. 10 is an isolated perspective view of the folding tire carrier located in its upright position with a tire coupled thereto.

An isolated perspective view of folding tire carrier 60 located in its upright position, with a tire 4 coupled thereto, is shown in FIG. 10. As illustratively shown, folding tire carrier assembly 60 includes a tire carrier support bracket 62 which holds a tire carrier 64 similar to tire carrier 20 discussed previously. Tire carrier support bracket 62 extends to a base bracket 66. Pivot pins 68 (see, also, FIG. 12) and 70 extend through both tire carrier support bracket 62 and base bracket 66 to allow tire carrier support bracket 62 to pivot with respect to base bracket 66. It is appreciated that tire carrier support bracket 62 may be pivoted in directions 76 or 78 between upright and laid flat positions.

A lock pin 72, with a snap lock bail 74 coupled thereto, may extend through both base bracket 66 and tire carrier support bracket 62 in order to keep same secured in the upright position shown. An illustrative knobbed fastener 80 may extend through both base bracket 66 and a tire foot (see FIG. 17) to further assist maintaining tire carrier support bracket 62 in the shown upright position and prevent rattling. A receiver post 82 extends from base bracket 66 and configured to extend into a receiver as further discussed herein (see FIG. 38). It is appreciated that tire carrier 64 includes sidewall panels 84 and 86 between rim support panel 88 similar in construction to sidewall panels 24 and 26 with rim support panel 28 extending therebetween from the tire carrier 20. In this current illustrative embodiment, sidewall panels 84 and 86 include a base flange 90 extending therefrom that secures tire carrier 64 to tire carrier support bracket 62. As illustratively shown, fasteners 92 fit into slots 94 on legs 96 and 98 of tire carrier support bracket 62. It is appreciated that slots 94 to allow tire carrier 64 to be removed from legs 96 and 98, if desired and to adjust for different tire diameters. It is appreciated that other means of attachment of tire carrier 64 may be employed to secure to tire carrier support bracket 62. Further shown herein is support panel 89 that attaches to sidewall panels 84 and 86, as well as rim support panel 88, to similarly assist in supporting panel 30 of tire carrier 20. It is further appreciated in this embodiment that tire carrier support bracket 62 may be made of extruded tubes. These extrusions may be made of metal, polymer or other structurally similar materials.

Figure 11:
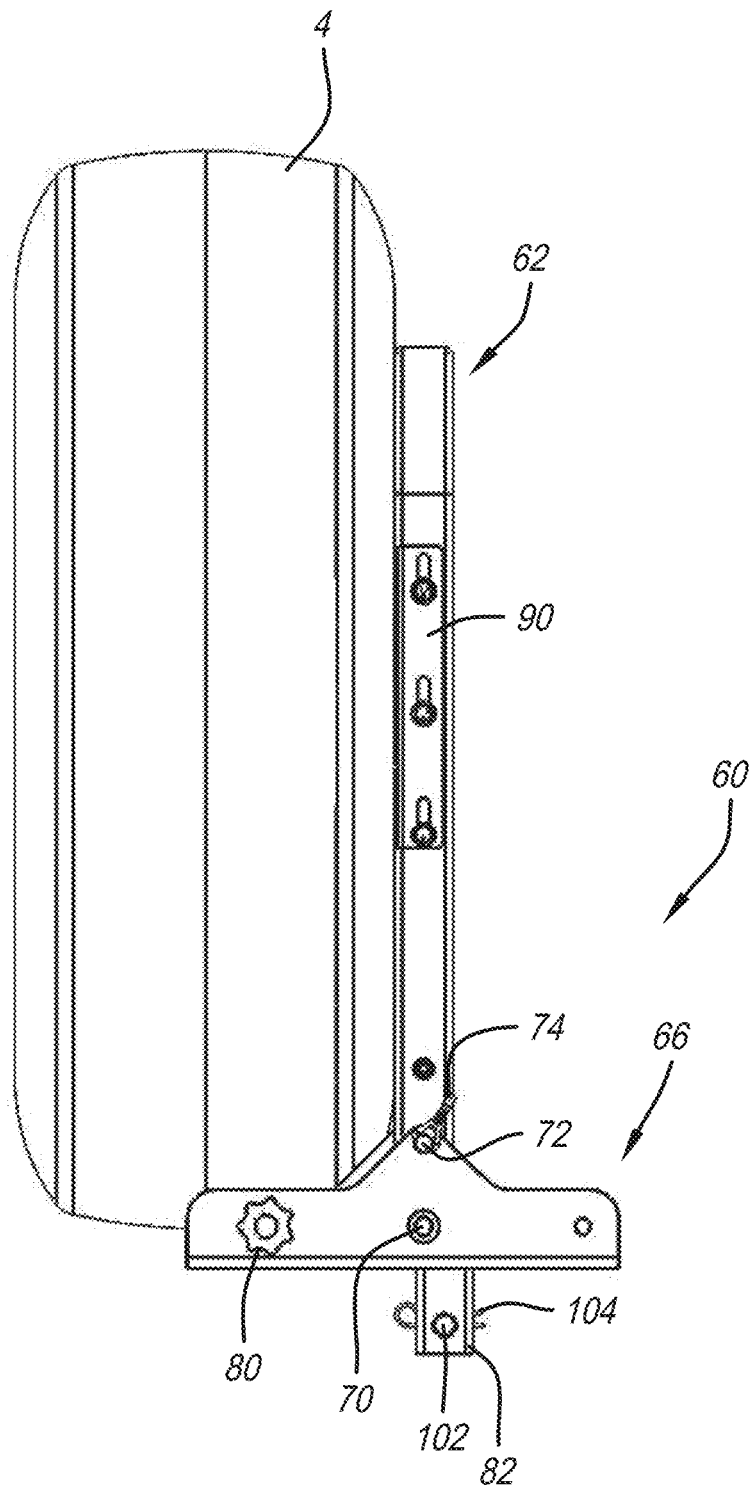
FIG. 11 is an isolated side view of the folding tire carrier located in its upright position and with a tire coupled thereto.
Figure 12:
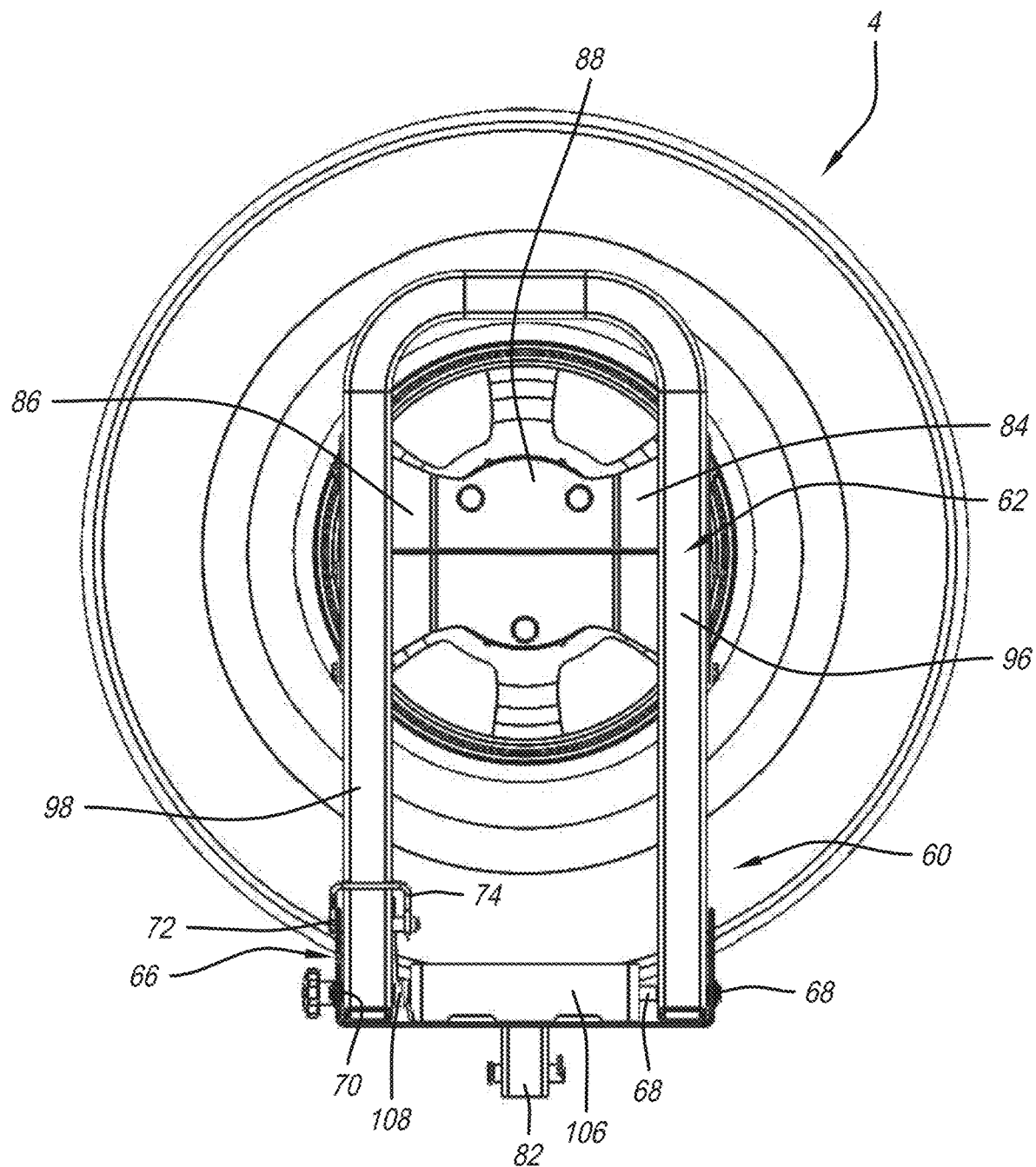
FIG. 12 is an isolated rear end view of the folding tire carrier located in its upright position and with a tire coupled thereto.

Side and rear views of folding tire carrier assembly 60, with a tire 4 coupled thereto, are shown in FIGS. 11 and 12. These views are similar to that of FIG. 10 except rotated to these perspectives. Tire carrier support bracket 62 is shown in its upright position with respect to base bracket 66. This view also shows base flange 90 of tire carrier 64 attached to tire carrier support bracket 62. Lock pin 72 with snap lock bail 74 are shown extending through base bracket 66 and tire carrier support bracket 62. Also shown is pivot pin 70 along with knobbed fastener 80. Receiver post 82 shown extending downward from base bracket 66 a securement pin 102 is shown extended through receiver post 82 with a cotter pin 104 attached to the securement pin 102 for purposes of securing receiver post 82 into a receiver as further discussed herein (see, also, FIG. 38).

Figure 13:
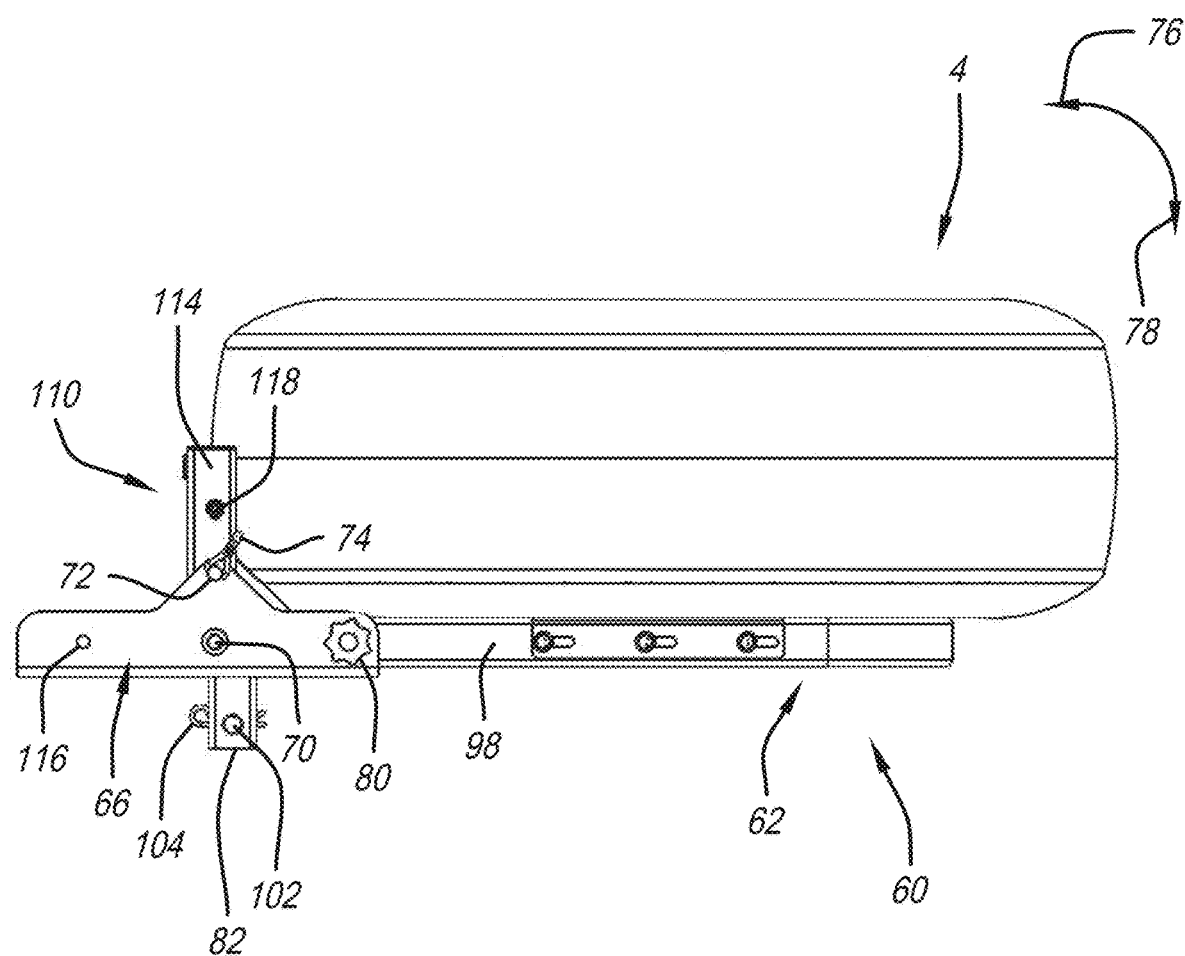
FIG. 13 is an isolated side view of the folding tire carrier located in its laid flat position with a tire coupled thereto.

An isolated side view of folding tire carrier 60, with a tire 4 coupled thereto and located in its laid flat position, is shown in FIG. 13. This view is similar to that of the view in FIG. 11, except that tire carrier support bracket 62 has been pivoted in direction 76 to the laid flat position. As shown, tire 4 is now positioned horizontal rather than vertical. In order to accomplish this, bail 74 is removed from lock pin 72 to the extent same can be removed from base bracket 66 and leg 98 of tire carrier support bracket 62. Additionally, knobbed fastener 80 is removed as well. With these securements removed, tire carrier support bracket 62 may pivot about pivot pin 68 and 70 in direction 78 to the laid flat position. Shown in this view is tire supports 110 which are composed of feet 112 and 114 attached to legs 96 and 98, respectively (see FIG. 14). Tire support 110 supports tire 4 while in its upright position on folding tire carrier assembly 60. In addition, tire support 110 provides a safety function by adding an additional securement. As shown herein, base bracket 66 includes opening 116 and foot 114 and includes opening 118. When tire carrier assembly 60 is located in an upright position, knobbed fastener 80 may be disposed through both openings 116 and 118 of base bracket and foot 114, respectively. This means that in addition to lock pin 72, when disposed through both base bracket 66 and leg 98 of tire carrier support bracket 62, redundant securement means are employed to ensure tire carrier support bracket 62 remains in its upright position, as well as prevent adjacent parts from rattling.

When tire carrier support bracket 62 is located in its laid flat position shown in FIG. 13, lock pin 72 is disposed now through both base bracket 66 and foot 114 to keep tire carrier support bracket 62 in the position shown. As a safety redundancy, knobbed fastener 80 may be disposed through another portion of the base bracket 66 and leg 98. Knobbed fastener 80 also keeps the parts from rattling. Also shown in this view is receiver post 82 extending from base bracket 66 with securement pin 102 and cotter pin 104 coupled to securement pin 102.

Figure 14:
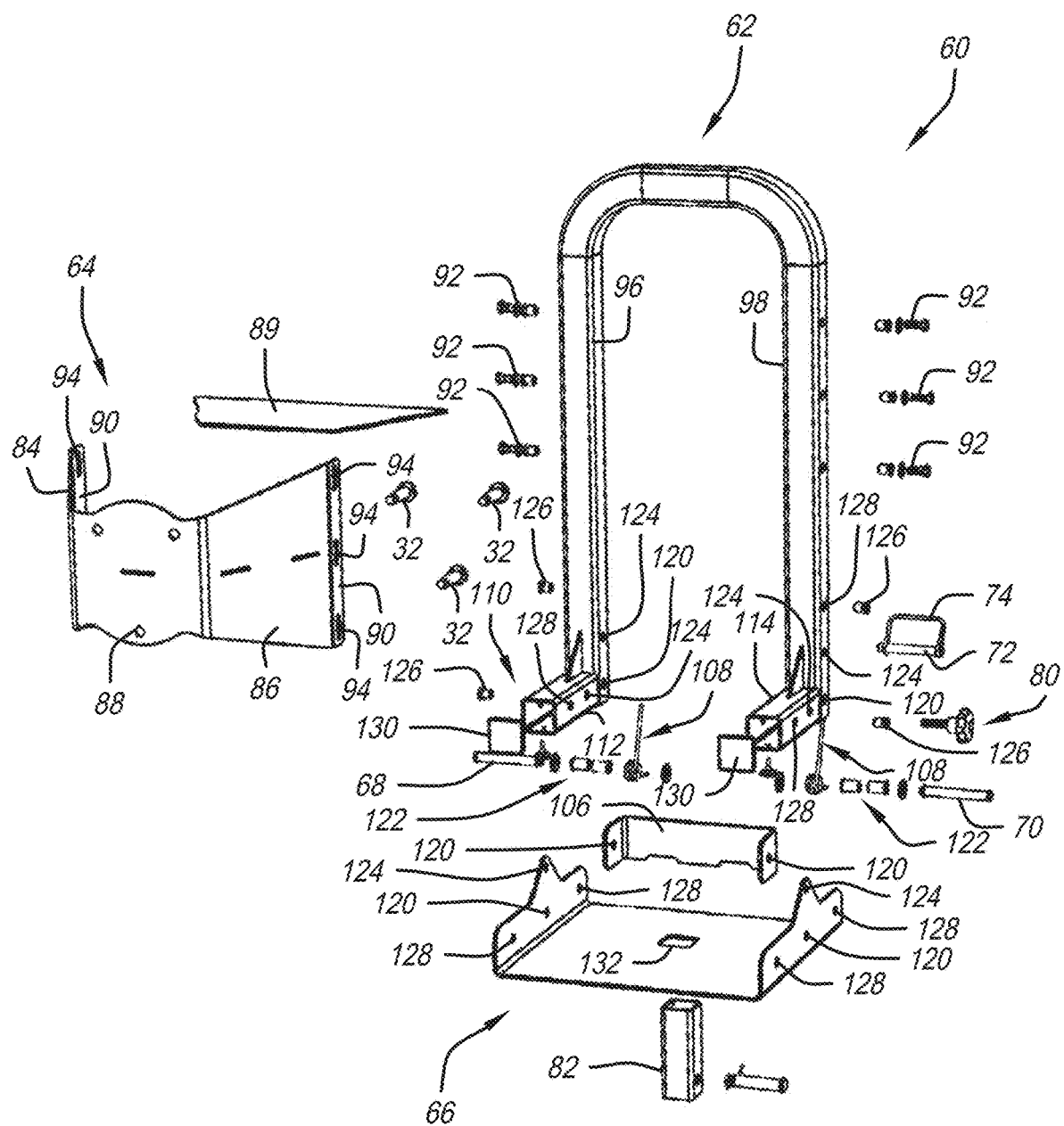
FIG. 14 is a front perspective exploded view of the folding tire carrier.
Figure 15:
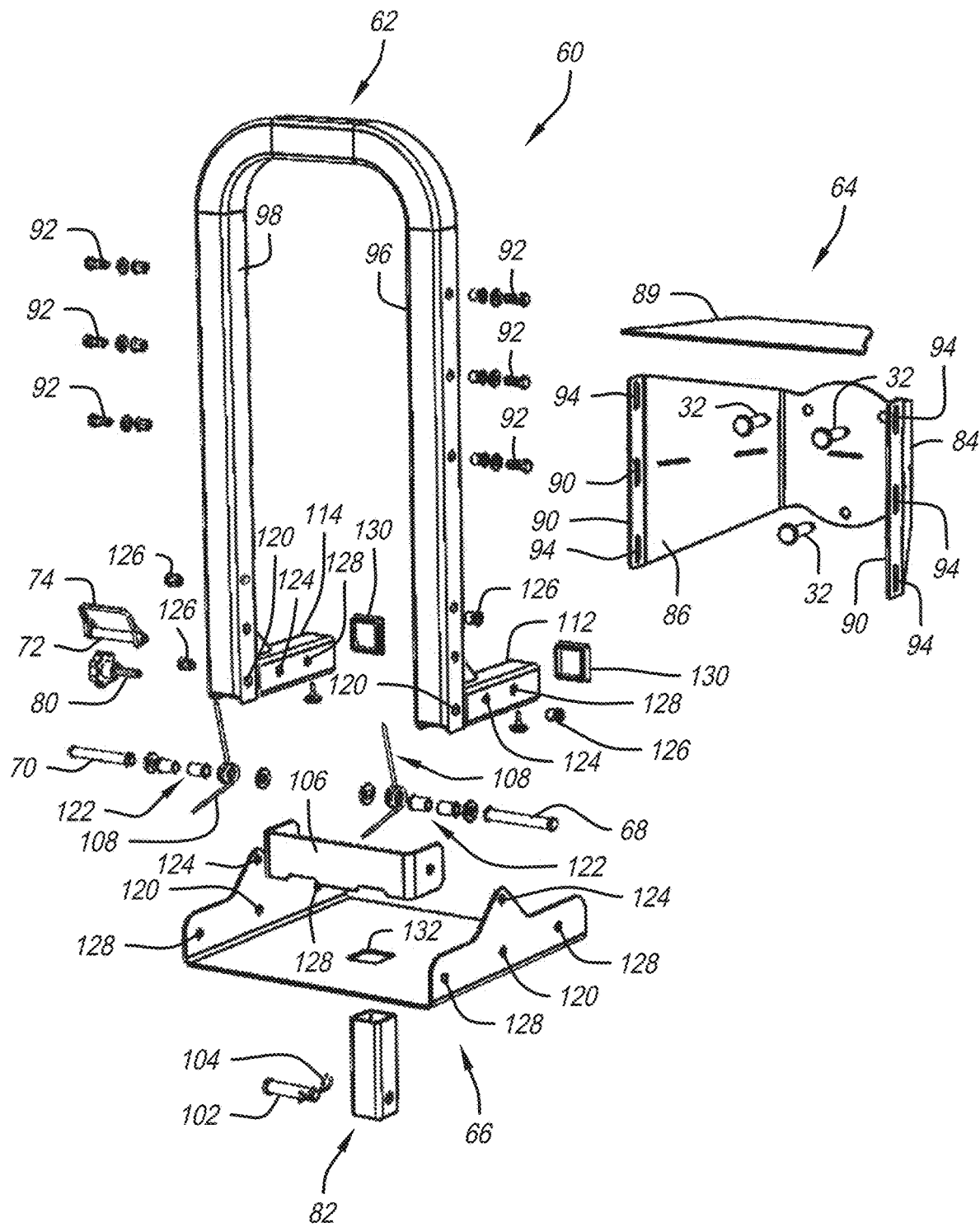
FIG. 15 is a rear perspective exploded view of the folding tire carrier.

Front and rear perspective exploded views of folding tire carrier assembly 60 are shown in FIGS. 14 and 15. As depicted, tire carrier support bracket 62, with depending legs 96 and 98, terminate at tire support 110 composed of feet 112 and 114 laterally extending from legs 96 and 98, respectively. Base bracket 66 illustratively with upturned walls receives pivot bracket 106 on one side and receiver post 82 extending from the other. A post opening 132 is disposed in base bracket 66 configured to receive receiver post 82 for securement thereto. Tire carrier 64 is shown with sidewall panels 84 and 86 with rim support panel 88 extending therebetween and configured to couple to a tire. Support panel 89 may extend between sidewall panels 84 and 86 to abut rim support panel 88 to create a tire carrier 64 of similar configuration to tire carrier 20. Sidewall panels 84 and 86 each have its own base flange 90 extending therefrom, respectively, with slots 94 disposed therethrough 4 receiving fasteners 92 for securing tire carrier 64 to each of legs 96 and 98 of tire carrier support bracket 62, respectively. Lugs 32 extend through rim support panel 88 similar to that described with respect to rim support panel 28 of tire carrier 20. Pivot openings 120 are each disposed through legs 96 and 98, respectively, for receiving pivot pin 68 and 70, respectively, which each also are disposed through pivot openings 120 and the upper extending walls of base bracket 66, as well as walls of pivot bracket 106, as illustratively shown. This allows tire carrier support bracket 62 to pivot with respect to base bracket 66. One or more bushings and washer assemblies 122 may be disposed about pivot pin 68 and 70 for purposes of creating smoother motion between tire carrier support bracket 62 and base bracket 66 by reducing metal-on-metal contact between the structures. Lock openings 124 may be disposed through legs 96 and 98 of tire carrier support bracket 62, as well as the upturned walls of base bracket 66 for purposes of receiving lock pin 72. It's appreciated that various other bushings 126 may be extended through the various openings disclosed herein for purposes of reducing metal-on-metal contact between the various components disclosed herein. Redundant lock openings 128 may be disposed through feet 112 and 114 of tire support 110, as well as upturned walls of base bracket 66. Springs 108 may also be disposed about each of pivot pin 68 and 70 to provide bias on legs 96 and 98, respectively, of tire carrier support bracket 62 for biasing same from its laid flat position in direction 76 towards its upright position. Redundant lock openings 128 are configured to receive knobbed fastener 80 for purposes of creating redundant securement between base bracket 66 and tire carrier support bracket 62 when both are in a laid flat position as shown in FIG. 13 or an upright position as shown in FIG. 11. End caps 130 may be placed over the openings of feet 112 and 114, respectively.

Figure 16:
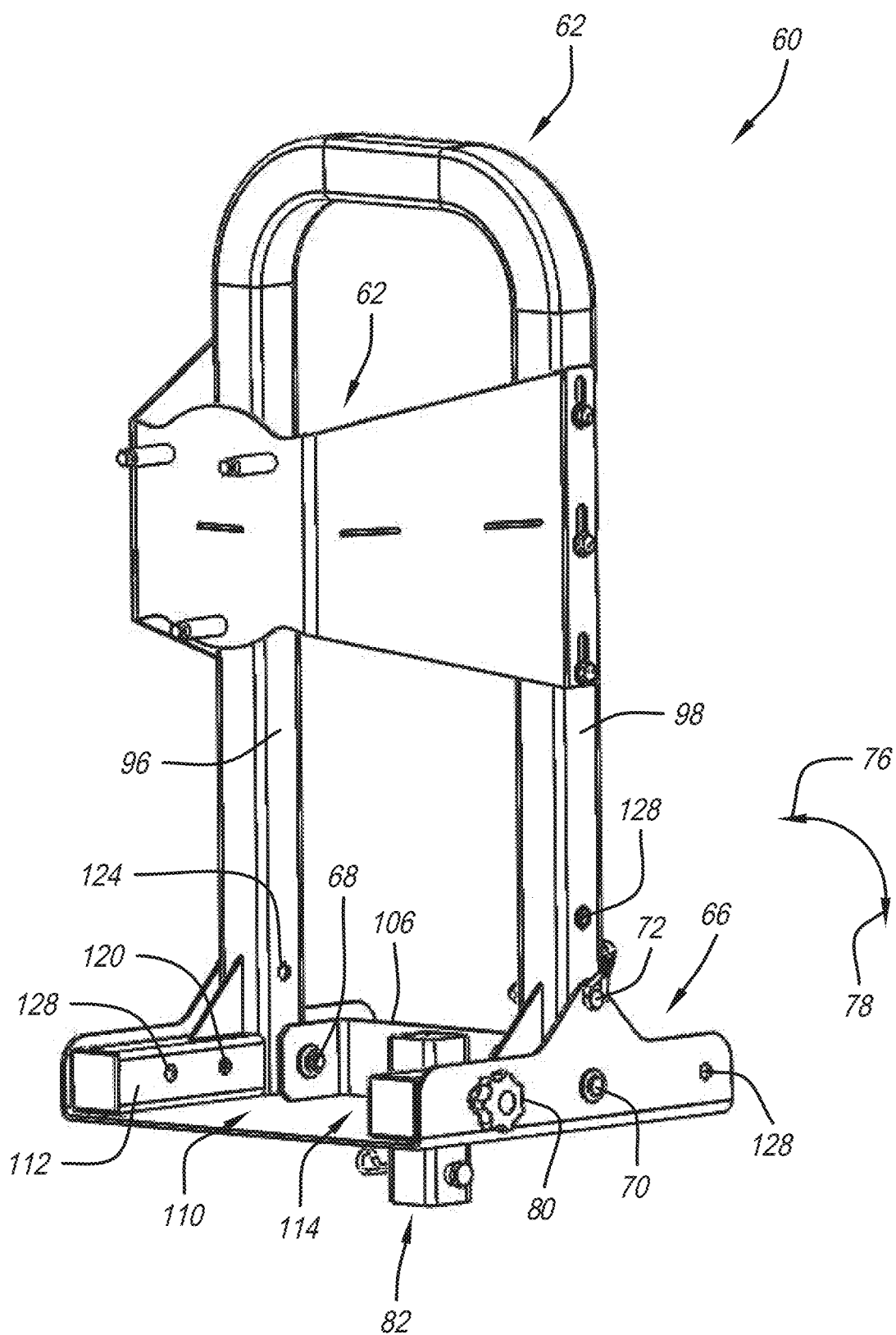
FIG. 16 is a front perspective view of the folding tire carrier located in its upright position.
Figure 17:
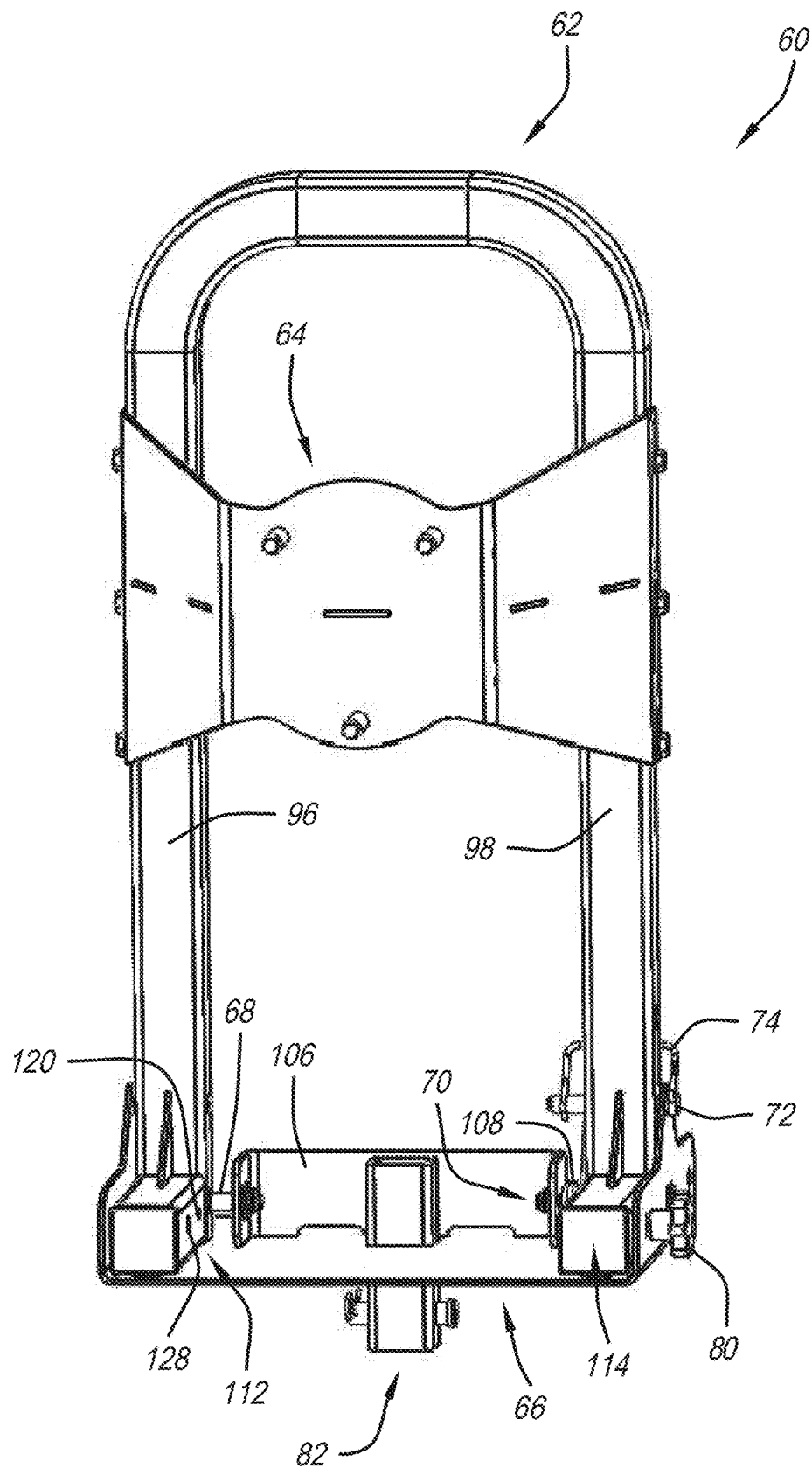
FIG. 17 is another front perspective view of the folding tire carrier in its upright position.
Figure 18:
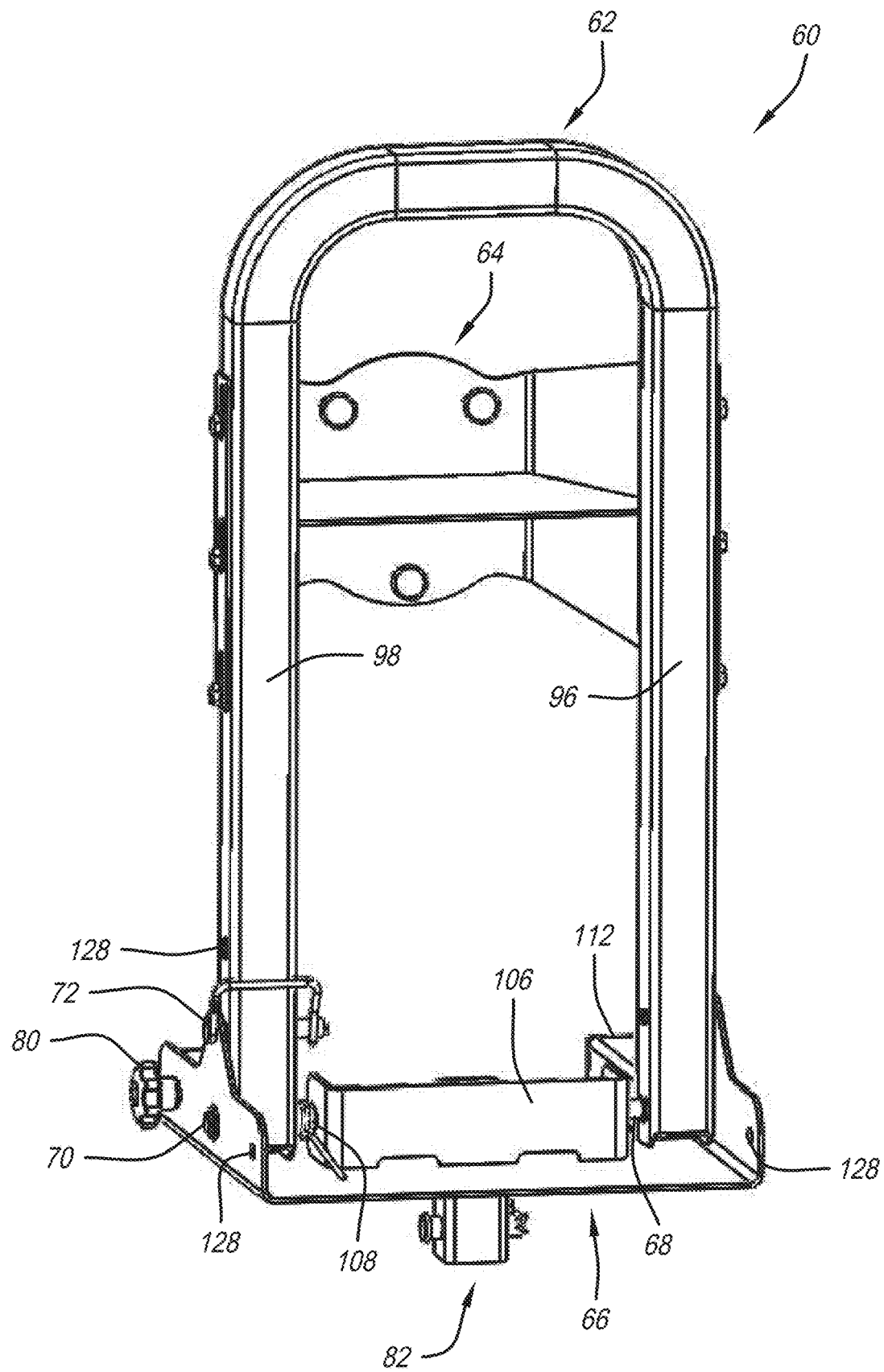
FIG. 18 is a rear perspective view of the folding tire carrier located in its upright position.

Front and rear perspective views of folding tire carrier assembly 60 are shown in FIGS. 16, 17, and 18. These views depict tire carrier support bracket 62 with tire carrier 64 secured thereon coupled to base bracket 66. These views further show pivot pins 68 and 70 disposed through base bracket 66, legs 96 and 98, as well as pivot bracket 106. Separate spring 108 may be disposed on either one or more of pivot pins 68 and 70. Lock pin 72 is shown disposed through base bracket 66 and leg 98 to prevent tire carrier support bracket 62 from pivoting with respect to base bracket 66 without the lock pin 72 removed therefrom. It is appreciated that a lock pin 72 may be disposed through either leg 96 or 98 through lock opening 124 as needed. Also shown is knobbed fastener 80 also disposed through base bracket 66, as well as leg 114 of tire support 110. Because tire support 110 is attached to tire carrier support bracket 62, this redundant securement means further assists preventing tire carrier support bracket 62 from inadvertently pivoting in direction 78. This redundant securement means may also alleviate rattling between the parts when tire carrier support bracket 62 is moved in direction 78 to its laid flat position. Knobbed fastener 80 may be disposed through the opposing redundant lock opening 128, in both base bracket 66 and leg 98 to keep tire carrier support bracket 62 in the laid flat position against the bias of springs 108. It is appreciated that no fastener 80 is illustrative and may be replaced with other mechanical means such as a pin, bolt, bar, latch, or other like fastening means. These views also show receiver post 82 extending from base bracket 66 opposite tire carrier support bracket 62.

Figure 19:
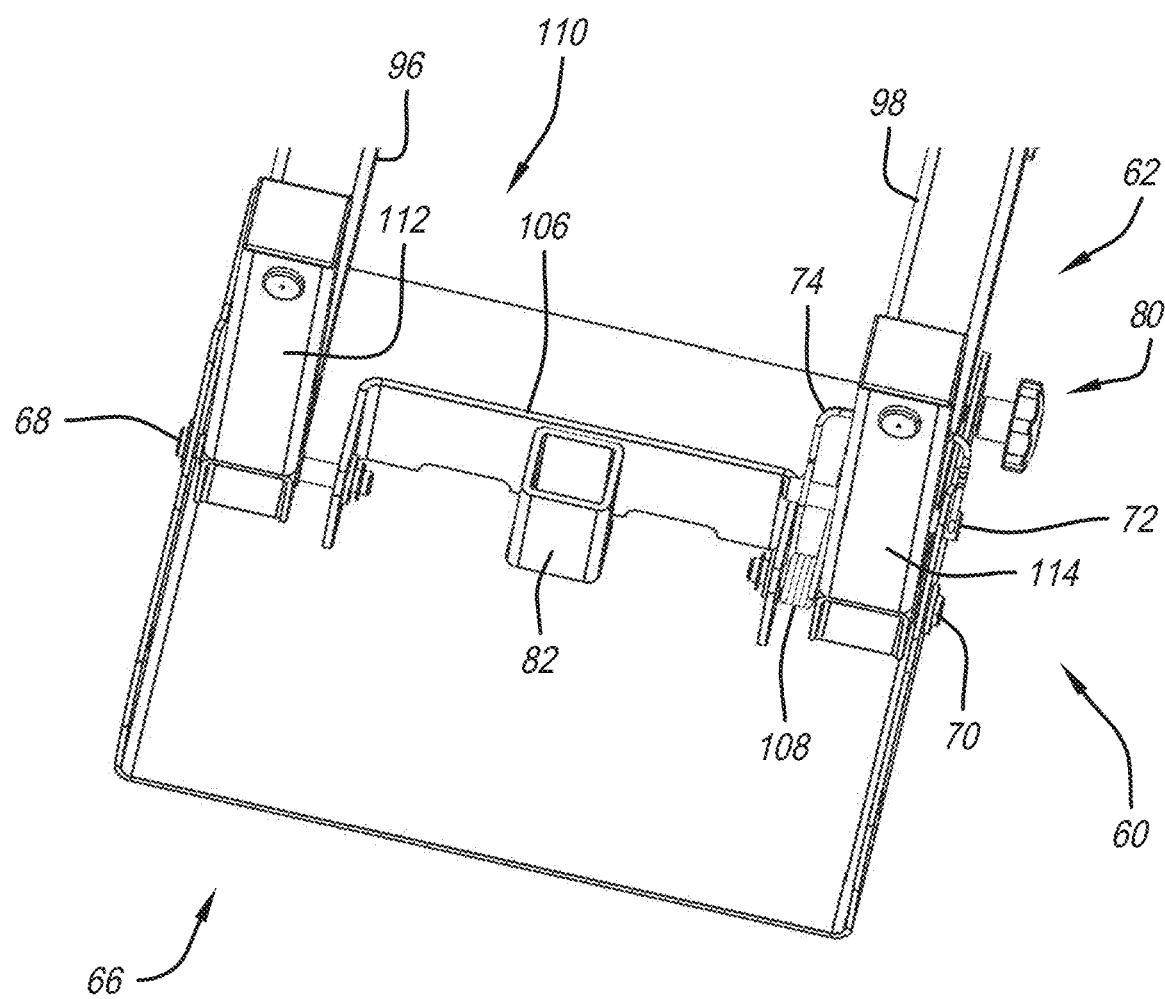
FIG. 19 is a front detail perspective view of a portion of the folding tire carrier in its laid flat position.
Figure 20:
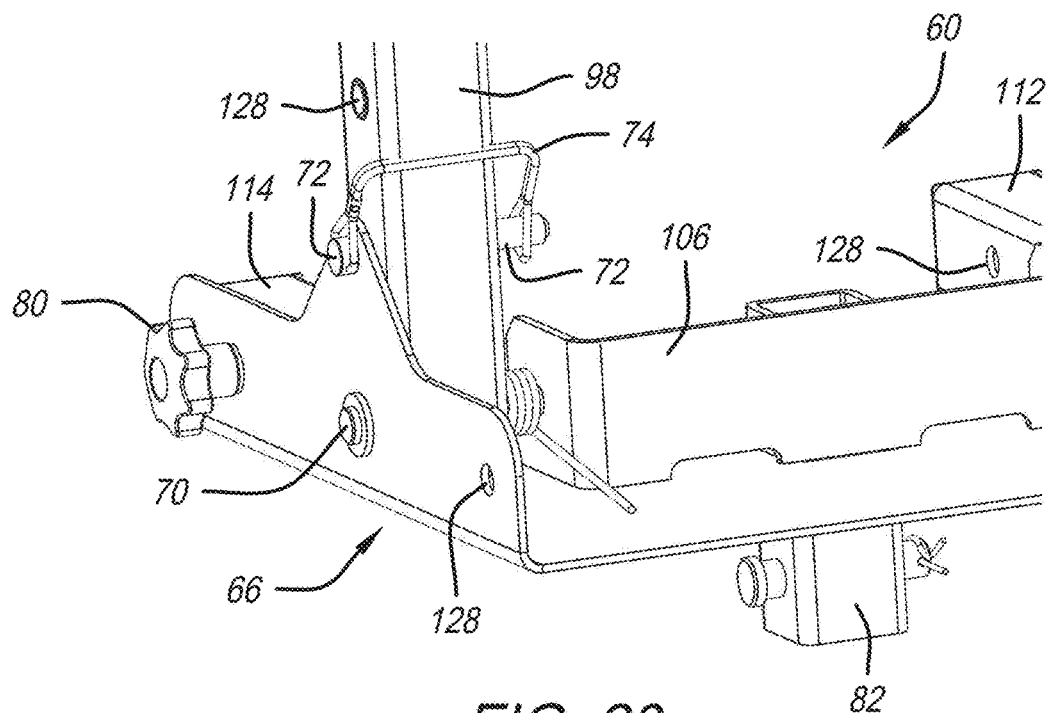
FIG. 20 is a rear detail perspective view of a portion of the folding tire carrier in its upright position.
Figure 21:
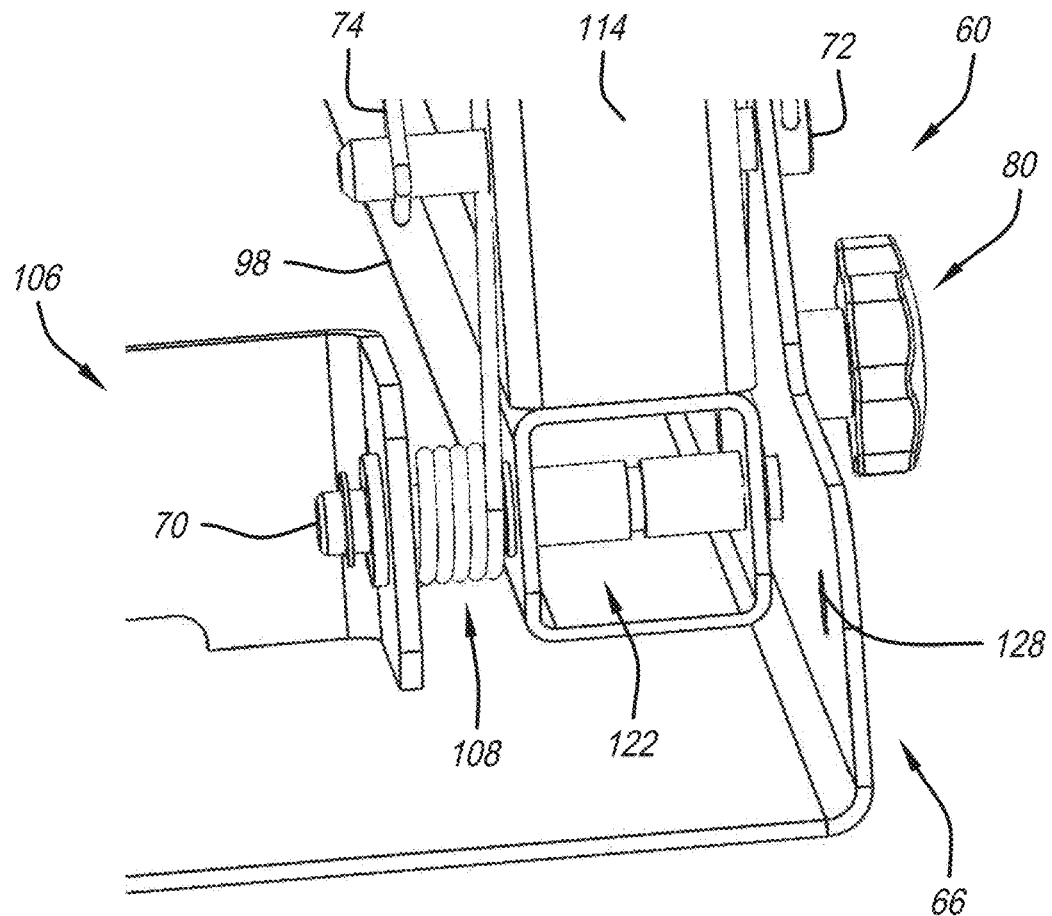
FIG. 21 is another front detail perspective view of a portion of the folding tire carrier in its laid flat position.

Detail front and rear perspective views of folding tire carrier assembly 60 are shown in FIGS. 19, 20, and 21. The view shown in FIG. 19 includes a portion of tire carrier support bracket 62 in its laid flat position with respect to base bracket 66. Here, tire support 110 with feet 112 and 114 are extended upwardly. This view also shows pivot pins 68 and 70 each disposed through base bracket 66, respective legs 96 and 98, as well as pivot bracket 106, respectively. It is appreciated how tire carrier support bracket 62 may pivot between upright and laid flat positions between the upturned wall portions of base bracket 66 and pivot bracket 106. This view also shows spring 108 illustratively located about pivot pin 70 to bias tire carrier support bracket 62 toward an upright position. As further shown here, however, with lock pin 72 disposed through both base bracket 66 and foot 114, any bias from spring 108 cannot overcome that securement. Tire carrier support bracket 62 will be unable to move until, in this case, snap lock bail 74 uncouples from lock pin 72 and removed same from foot 114 and base bracket 66. Additionally, knobbed fastener 80 is shown disposed through both base bracket 66 and into leg 98. This redundant securement means is an additional layer of safety if lock pin 72 either breaks or is not properly inserted into the appropriate structures.

The rear detail perspective view of a portion of folding tire carrier assembly 60 is shown in FIG. 20. Here, a detailed review of leg 98 secured to base bracket 66 and in an upright position. Again, pivot pin 70 is shown disposed through base bracket 66, leg 98, and pivot bracket 106. Knobbed fastener 80 may alternatively be disposed in base bracket 66 as well as foot 114. As a redundant securement means to lock pin 72.

In the front detail perspective view of a portion of folding tire carrier assembly 60 shown in its laid flat position, lock pin 72 is shown disposed through both base bracket 66 and foot 114 to keep tire carrier support bracket 62 in its laid flat position until it is desired to be moved. Knobbed fastener 80 is also shown disposed through both base bracket 66 and leg 98. It is further appreciated in this view how tire carrier support bracket 62 pivots about pivot pin 70. Illustratively, pivot pin 70 is disposed through base bracket 66, leg 98, and pivot bracket 106. Also shown is bushings and washer assemblies 122 that receive pivot pin 70 (as well as pivot pin 68 on the other side of tire carrier support bracket 62) to assist in smoother pivoting between base bracket 66 and tire carrier support bracket 62 by reducing metal to metal contact between the structures. Spring 108 is also shown disposed about pivot pin 70.

Figure 22:
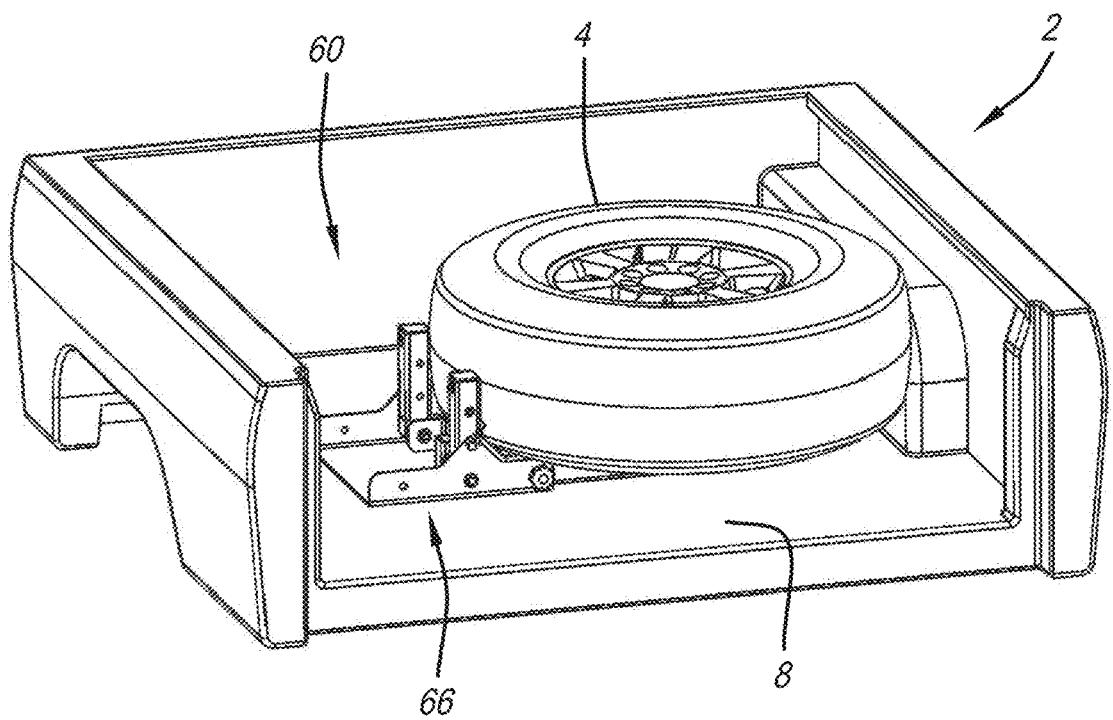
FIG. 22 is a perspective view of a cargo box with the folding tire carrier, with a tire coupled thereto, attached to the bed and in its laid flat position.
Figure 23:
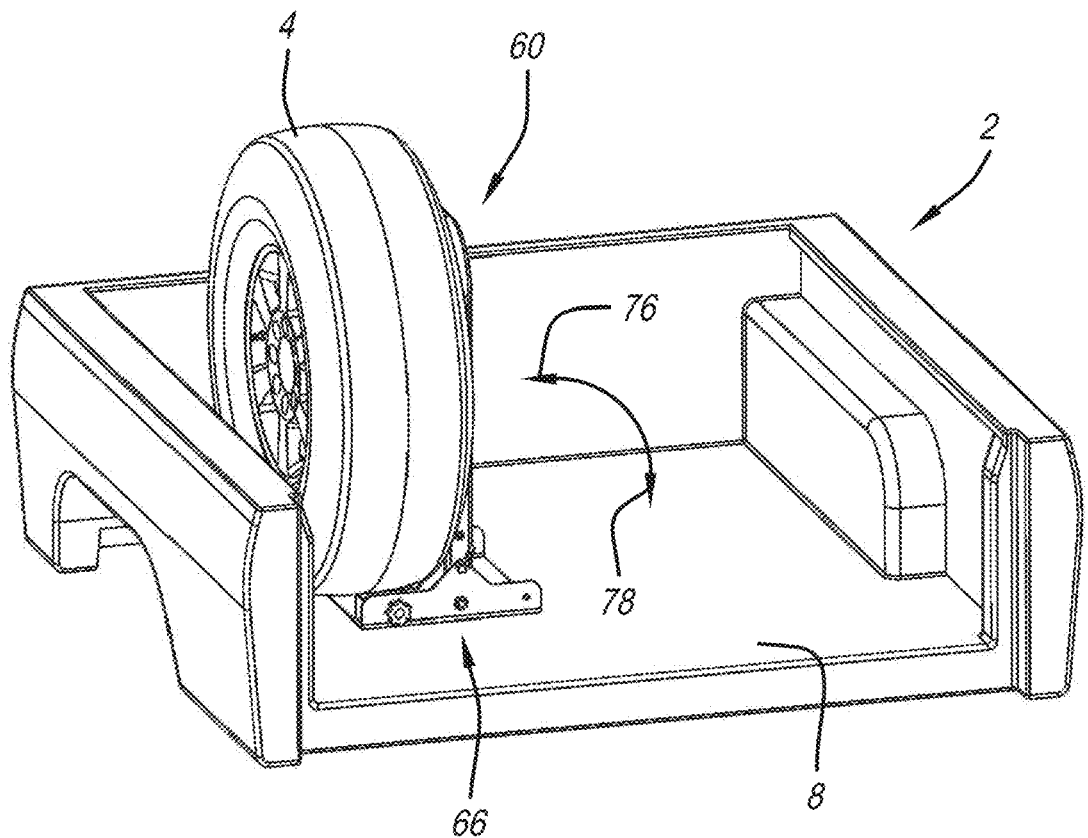
FIG. 23 is another perspective view of the cargo box with the folding tire carrier, with a tire coupled thereto, attached to the bed and located in its upright position.

Perspective views of cargo box 2 with folding tire carrier assembly 60 are shown in both FIGS. 22 and 23. The view shown in FIG. 22 includes folding tire carrier assembly 60 located in its laid flat position with tire 4 secured thereon. In contrast, the view in FIG. 23 includes folding tire carrier assembly 60 moved in direction 76 and located in its upright position with tire 4 secured thereon. A distinction in these views is that base bracket 66 is shown attached to bed 8 of cargo box 2 rather than having receiver post 82 extending from base bracket 66. Fasteners or other like securement means may be disposed through base bracket 66 to secure to bed 8.

Bike Rack

Another illustrative embodiment of the present disclosure provides a modular bike rack configured to attach to the deck of a bedslide located in a pickup truck cargo box. Like the folding tire carrier, the bike rack includes a post that is sized to fit into a corresponding receiver disposed through the top surface of the bedslide deck. The bike rack (as well as the folding tire carrier) has a depending post that can be fitted into a receiver disposed through the deck of the bedslide. Having such receivers at various locations on the deck allows the folding tire carrier, bike rack, or any other type of racking or like accessories to be secured to the deck of the bedslide. The post of the bike rack may be sized to not only fit within the receiver on the bedslide deck, but also in the tailgate hitch under the cargo box. In an illustrative embodiment, the bike rack may include a support bracket that is attachable to a post. The post may be oriented in either vertical or horizontal orientations depending on if the bike rack is intended to be attached to the hitch or the bedslide. A bike rack support may be attached to the support bracket in order to hold one or more bicycles. It is appreciated that the support bracket may be used for other functions alternative to supporting a bike rack. For example, racks that hold kayaks, ladders, toolboxes, etc. may be attached to the support bracket or a modified support bracket so those structures may be carried selectively on the bedslide or on the hitch as well. It is further appreciated that other rack assemblies may be placed on top of the support bracket for carrying other items. The skilled artisan upon reading this disclosure will appreciate that the bike rack portion is illustrative, and other racks such as those previously discussed, may replace the bike rack on the support bracket.

Additionally, multiple support brackets may be used to carry other types of racks or like accessories to be held in the cargo box.

Figure 24:
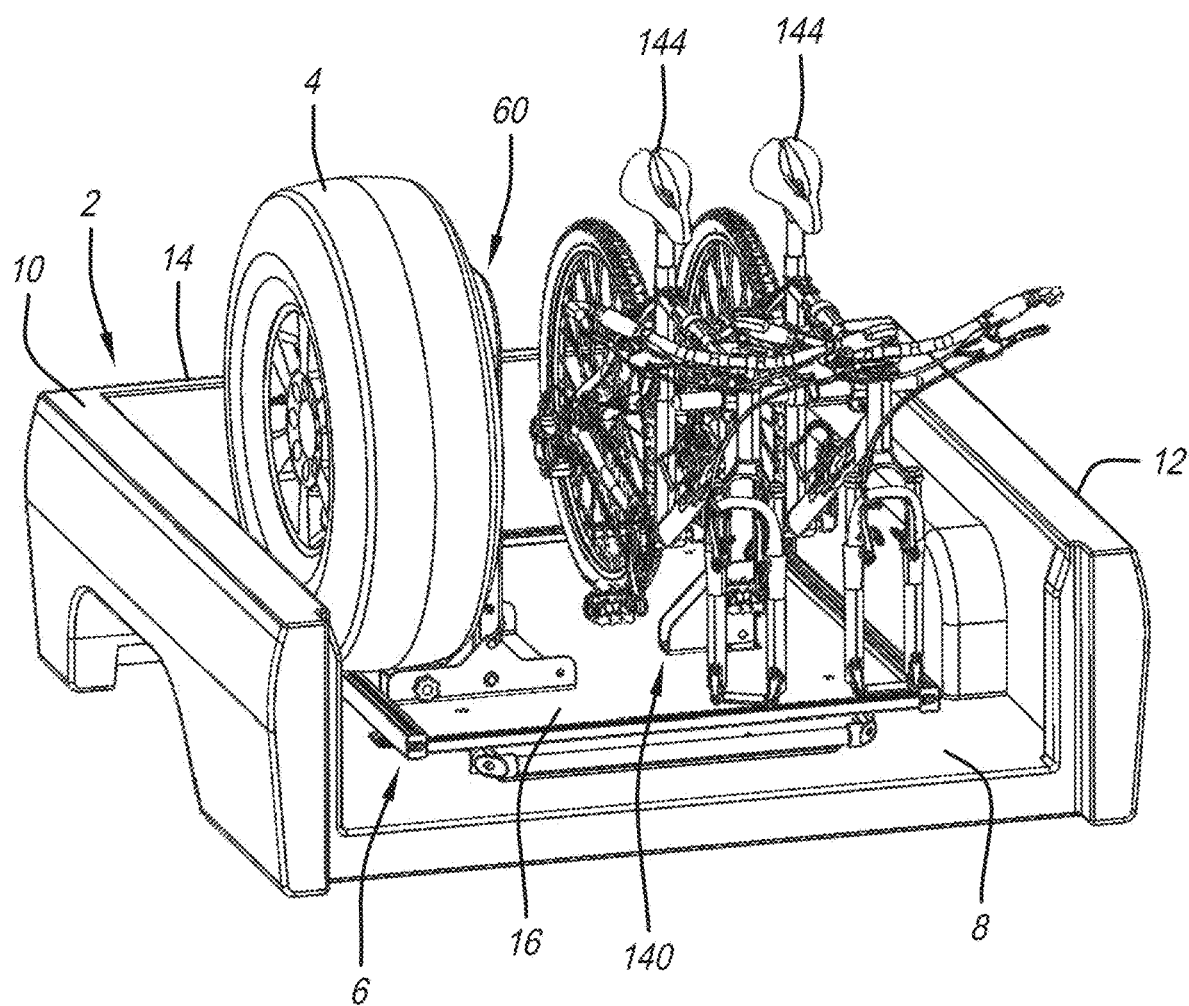
FIG. 24 is a perspective view of a cargo box with a bedslide located thereon in its retracted stowed position with a folding tire carrier and a bike rack attached thereto.
Figure 25:
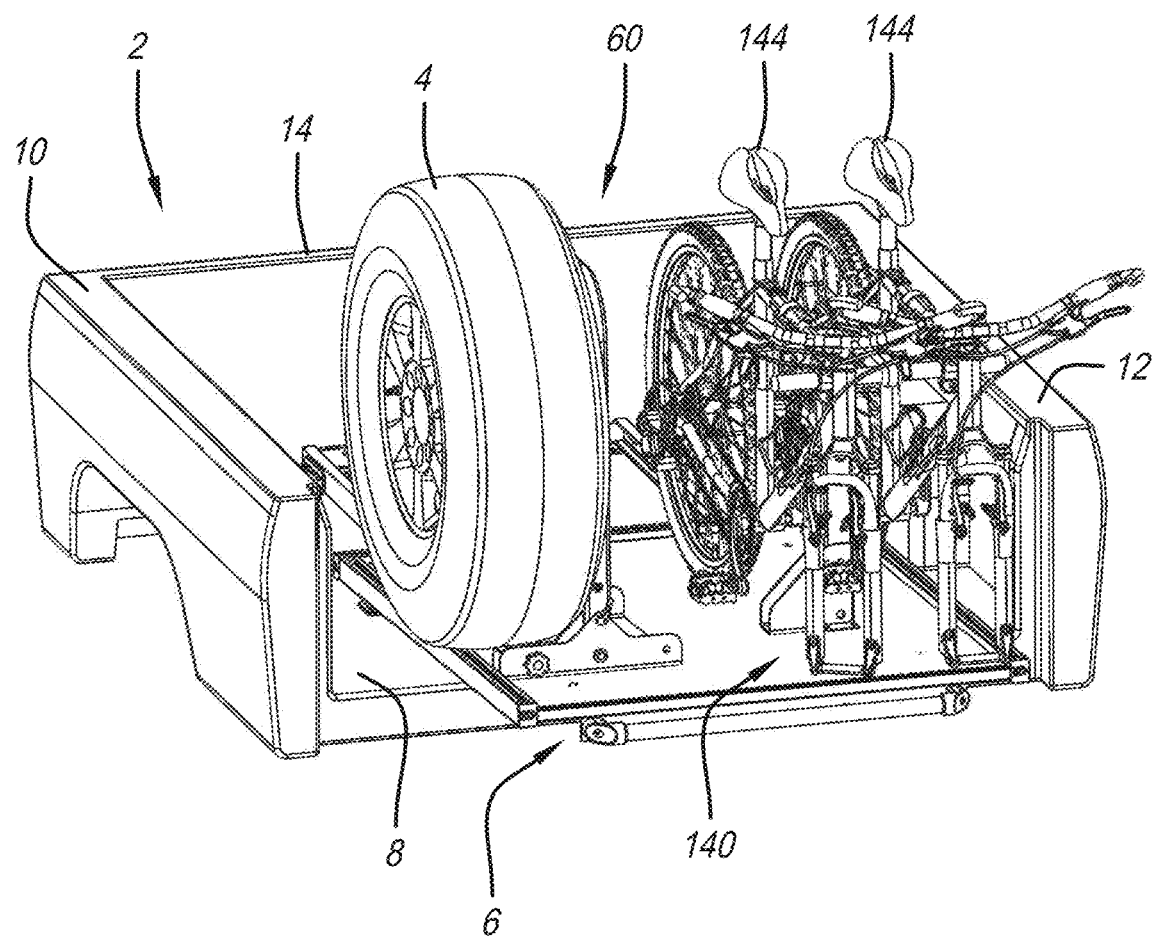
FIG. 25 is another perspective view of a cargo box with a bedslide located thereon in its extended position with a folding tire carrier and a bike rack attached thereto.
Figure 26:
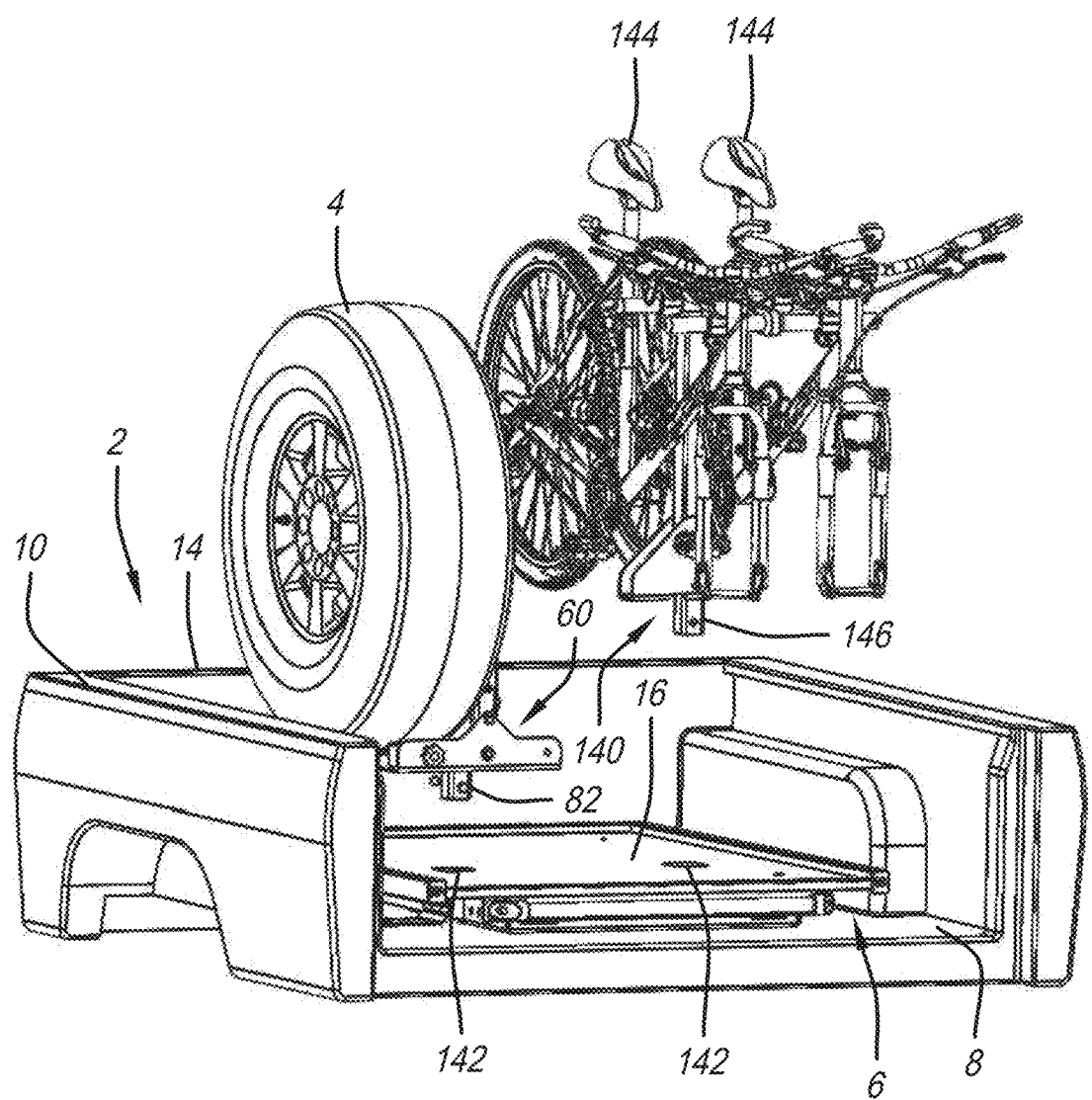
FIG. 26 is another perspective view of the cargo box and bedslide with the folding tire carrier and bike rack assembly in an illustrative exploded position with respect to the bedslide.

A perspective view of cargo box 2, with bedslide 6 installed therein, with folding tire carrier assembly 60 and an accessory or bike rack assembly 140 installed on bedslide 6, is shown in FIG. 24. This view demonstrates how various accessories can be attached to deck 16 or bed 8 of the bedslide or cargo box 2, respectively. Illustratively, bicycles 144 may be carried on bike rack assembly 140. The view in FIG. 25 is similar to that in FIG. 24 except bedslide 6 is extended to its use position with both folding tire carrier assembly 60 and accessory bike rack 140 secured thereon. This view further demonstrates how accessory racks, holders, etc. can be secured onto bedslide 6 via accessory ports or receivers 142 disposed through deck 16 of bedslide. 6. Receiver post 82 on folding tire carrier assembly 60 or receiver post 146 of bike rack assembly 140 may be inserted into any one of receivers 142 disposed through deck 16 of bedslide 6 for securing same. It is appreciated that these accessory carriers or racks may be secured to any one of the receivers based on space and organizational needs on deck 16. It is further appreciated that these carriers and accessory racks can be moved to different receivers on deck 16 as desired.

Figure 27:
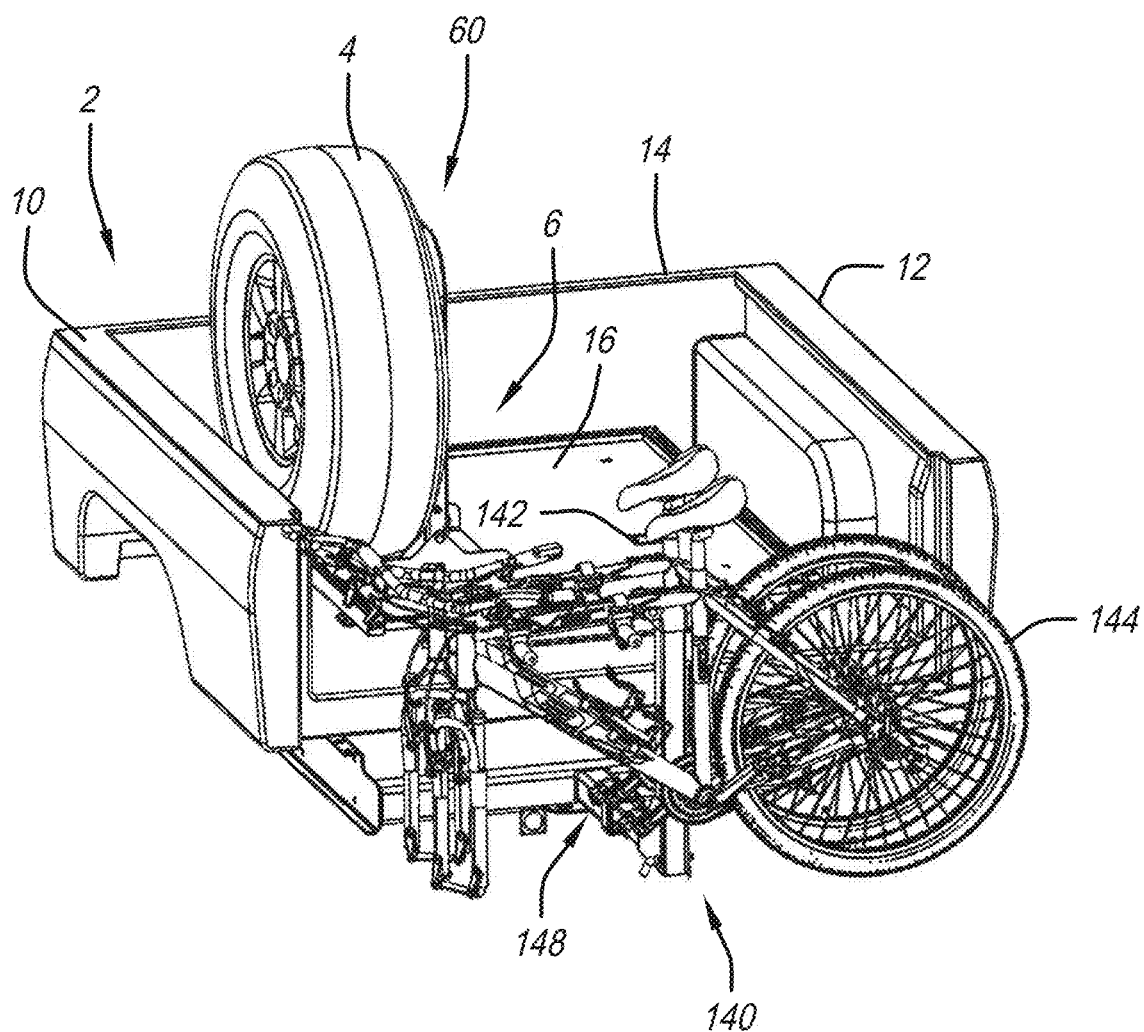
FIG. 27 is a perspective view of the cargo box with the folding tire carrier located thereon and the bike rack assembly attached to the tailgate hitch.
Figure 28:
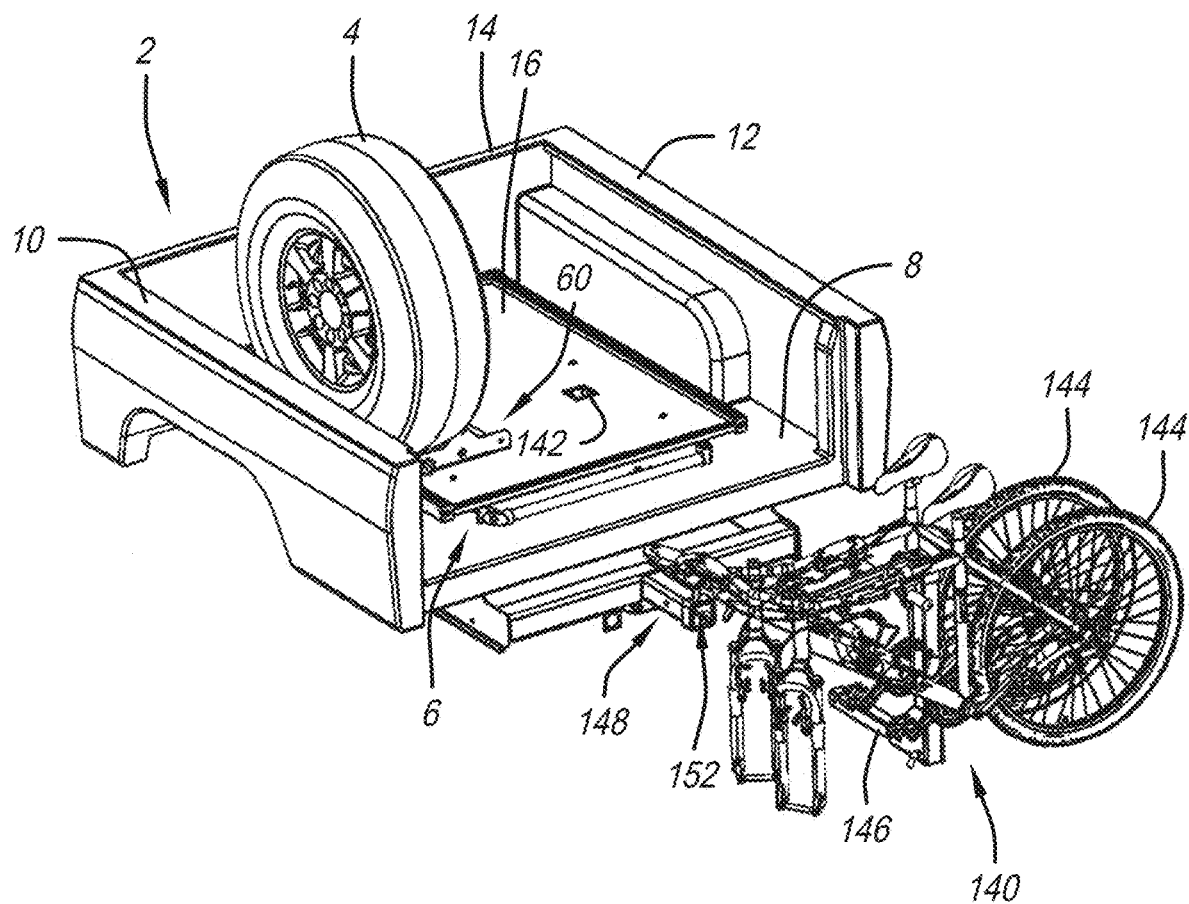
FIG. 28 is another perspective view of the cargo box with the folding tire carrier attached to the bedslide and the bike rack assembly removed from the tailgate hitch.
Figure 29:
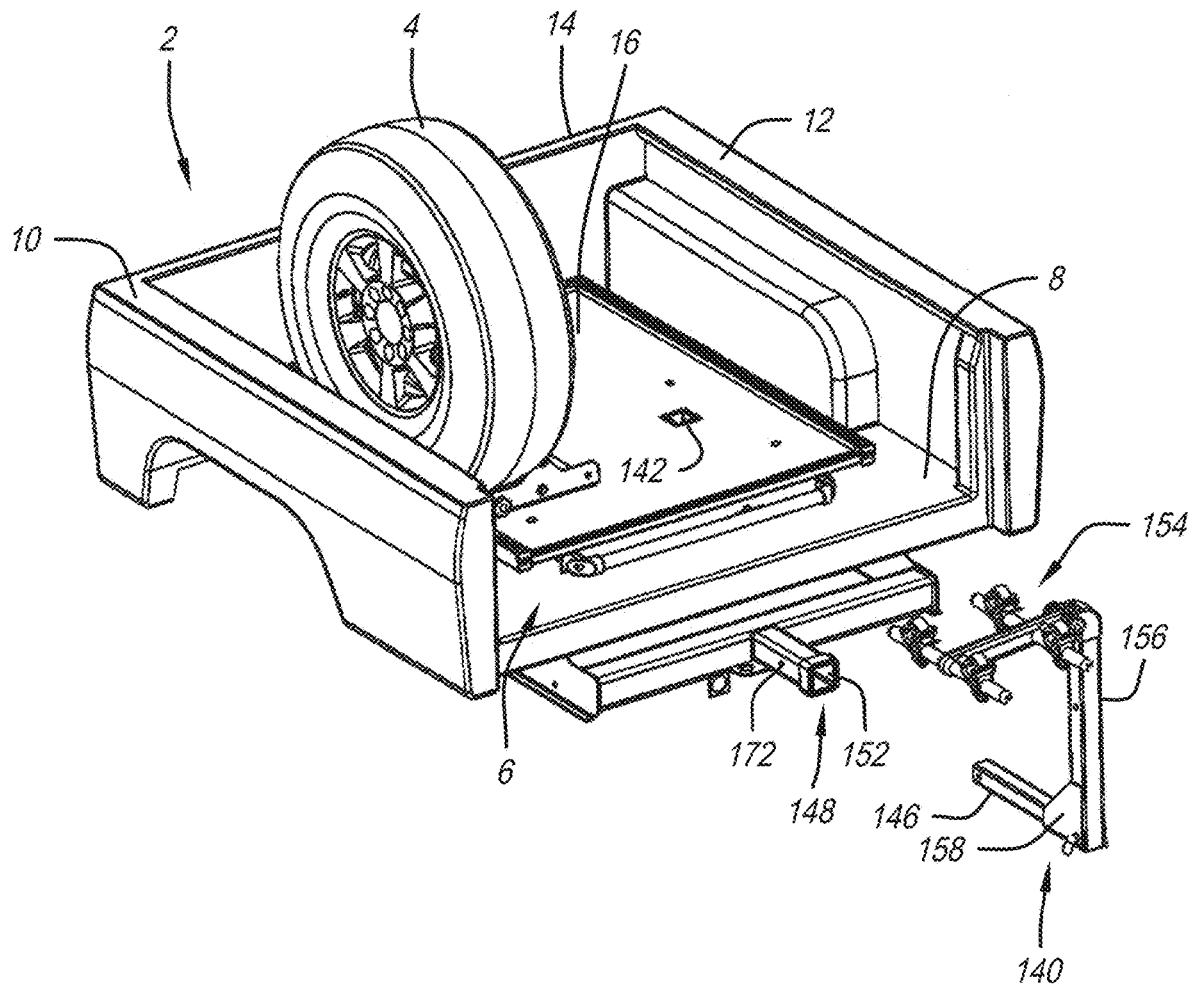
FIG. 29 is another perspective view of the cargo box with the folding tire carrier attached to the bedslide and the bike rack removed from the tailgate hitch.

Perspective views of cargo box 2 with a bedslide 6 installed thereon are shown in FIGS. 27, 28, and 29 illustrating an additional utility of bike rack assembly 140. As depicted in these views, bike rack assembly 140 may be supported in tailgate hitch 148 that extends from the underside of cargo box 2. Accordingly, such accessory racks may be modularly attached to either receivers 146 disposed through deck 16 of bedslide 6 or tailgate hitch 148. In FIG. 27, bike rack assembly 140 is shown attached to and extending from tailgate hitch 148 while folding tire carrier assembly 60 is secured onto deck 16 of bedslide 6. Having the versatility of securing bike rack assembly 140 onto either tailgate hitch 148 or receiver 142 on deck 16 provides the user with multiple storage configuration options.

The view in FIG. 28 is similar to that of FIG. 27, except for bike rack assembly 140 separated from tailgate hitch 148. As shown, bike rack assembly 140 includes a post 146 that is sized to fit into hitch opening 152 of tailgate hitch 148. The skilled artisan upon reading this disclosure will appreciate that post 146 may be sized and shaped to fit into either hitch opening 152 or receiver 142. Illustratively, the shape of hitch opening 152 is polygonal. Receiver 142 may have that same shape and be the same size. In this way, by hitch opening 152 and receiver 142 having a complimentary shape profile and size, bike rack assembly 140, as well as any other accessory structure having such complementarily sized and shaped post may be fitted into either opening to afford the user various attachment options.

The view in FIG. 29 is similar to that of FIG. 28, except with bicycles 144 removed from bike rack assembly 140. Here, bike rack assembly 140 is shown including bike rack 154 attached to support bracket post 156 also extending to base bracket 158 and post 146. It is appreciated that bike rack 154 may be oriented on support bracket post 156 in any desired fashion to accommodate the needs of carrying one or more bicycles 144. It is also appreciated that other accessory racks, containers, or other like structures may be attached to support bracket post 156.

Figure 30:
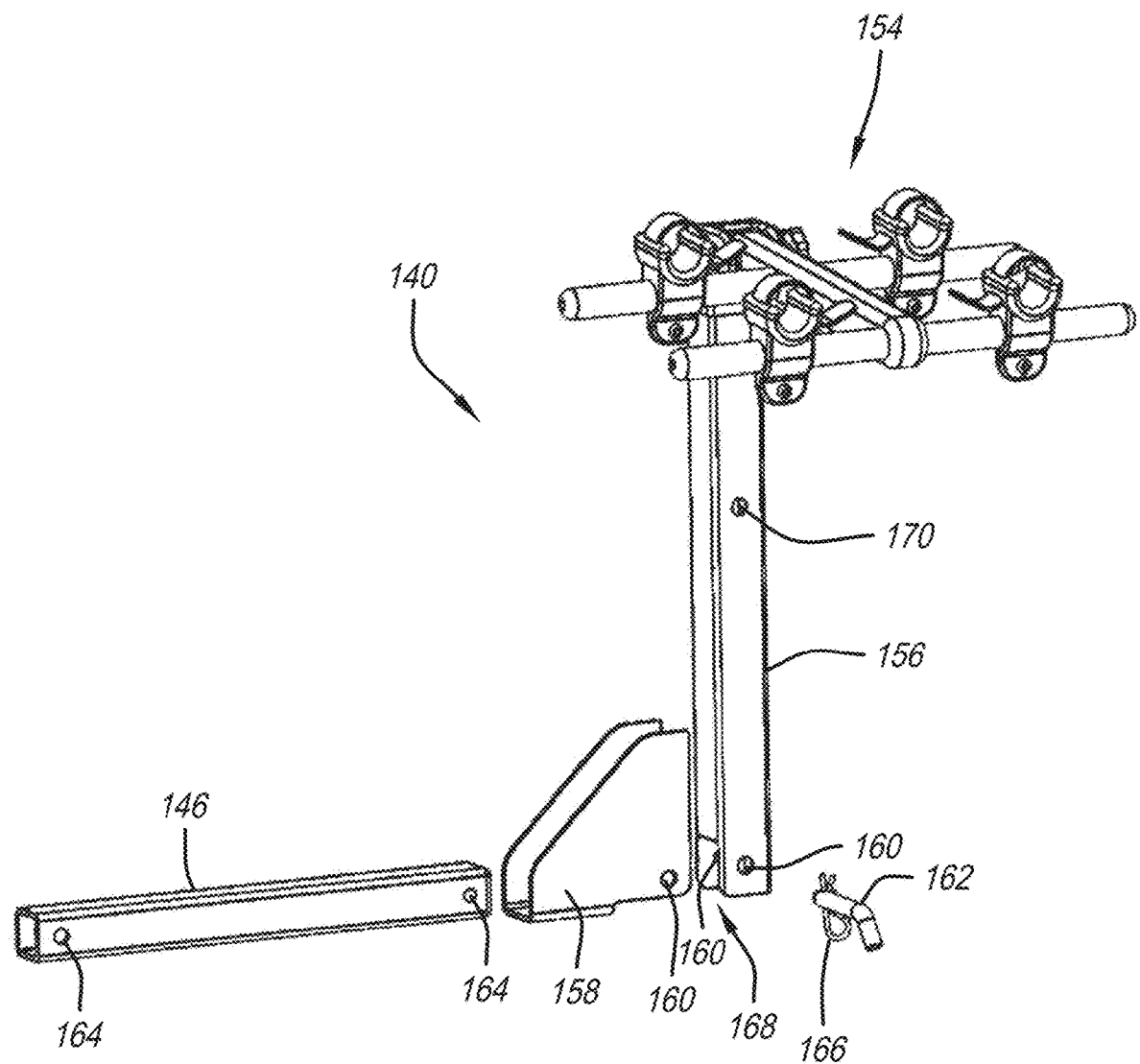
FIG. 30 is a side perspective partially exploded view of the bike rack assembly.
Figure 31:
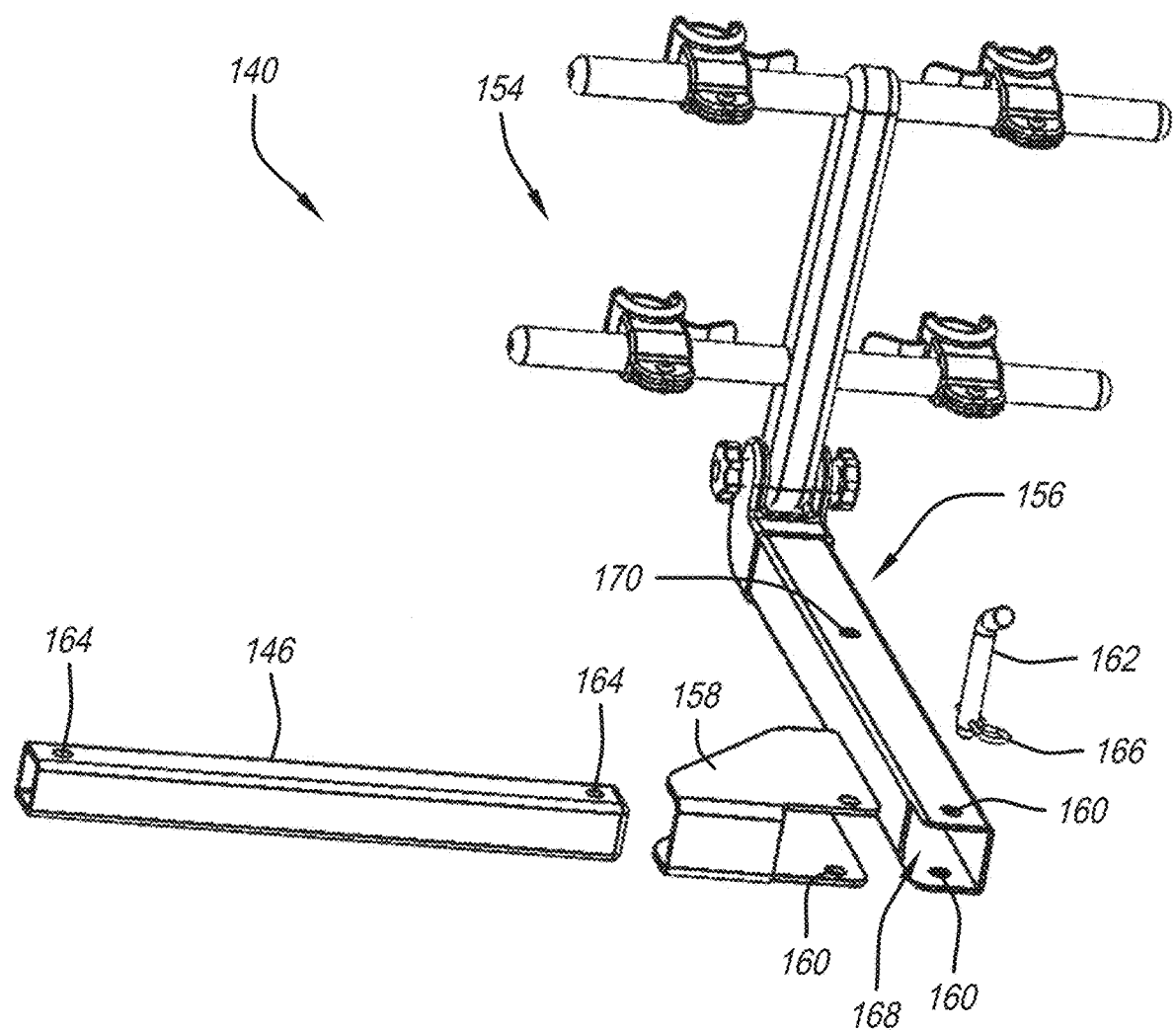
FIG. 31 is an underside perspective partially exploded view of the bike rack assembly.

Side and underside perspective exploded views of bike rack assembly 140 are shown in FIGS. 30 and 31. Bike rack 154 illustratively sits on and is attached to support bracket post 156. It is appreciated that the shown configuration of bike rack 154 and its structures for holding bicycles is illustrative. Other accessory racks, containers, or devices may also be attached to support bracket post 156. A base bracket 158 is attached to support post bracket 156. A horizontal lock pin opening 160 is disposed therethrough configured to align with horizontal lock pin opening 160 of support bracket post 156 to receive lock pin 162. A lock pin opening 164 is disposed through post 146. When same is positioned tangentially to support bracket post 156, locking pin 162 may be disposed through horizontal locking pin openings 160 of support bracket post 156 and base bracket 158. When lock pin 162 extends through lock pin opening 164 and post 146, the same is secured in its transverse position. Illustratively, a cotter pin 166 may be removably attached to lock pin 162 to keep same within lock pin openings 160 and 164 unless intentionally removed. A cut out 168 is formed at the lower end of support bracket post 156 to receive a portion of post 146 so that lock pin openings 160 and 164 from support bracket post 156, base bracket 158, and post 146, may all align to allow lock pin 162 to be disposed therethrough.

Additionally, a vertical lock pin opening 170 may be disposed through support bracket post 156 for purposes of securing post 146 within support bracket post 156 when post 146 is positioned in a vertical or coincident orientation with respect to support bracket post 156. Post 146 may be telescopingly positioned within support bracket post 156 and allow lock pin opening 164 to align with vertical lock pin opening 170 for securing the two structures together. Furthermore, lock pin opening 164 in post 146 may also be used to secure same to tailgate hitch 148. Locking pin opening 164 may be the same size as a corresponding locking pin opening 172 disposed through tailgate hitch 148 as shown in FIG. 29, for securing bike rack assembly 140 thereto. Support bracket post 156 may be tubes sized so that post 146 may telescopingly extended into support bracket post 156.

Figure 32:
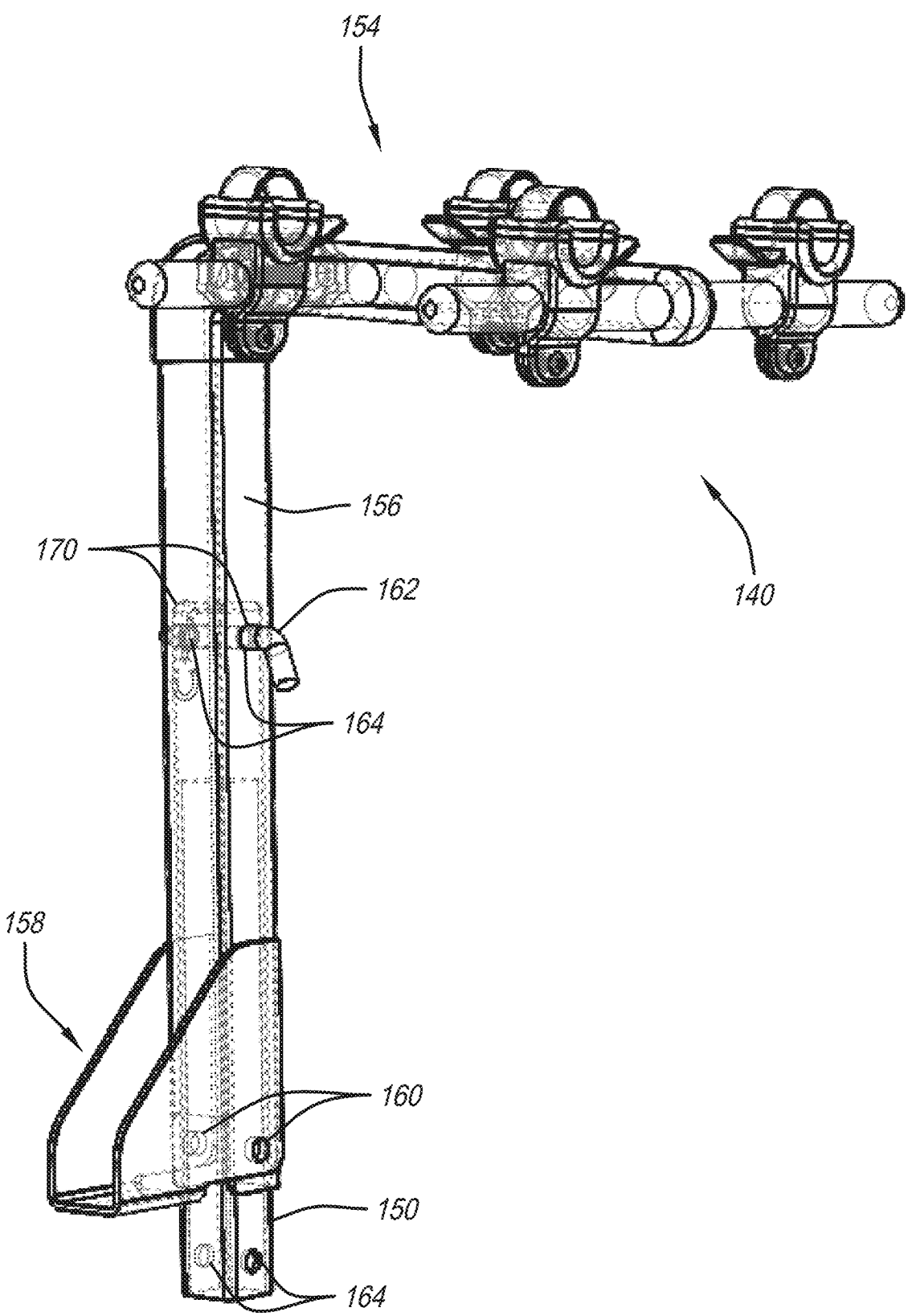
FIG. 32 is a perspective view of the bike rack assembly.
Figure 33:
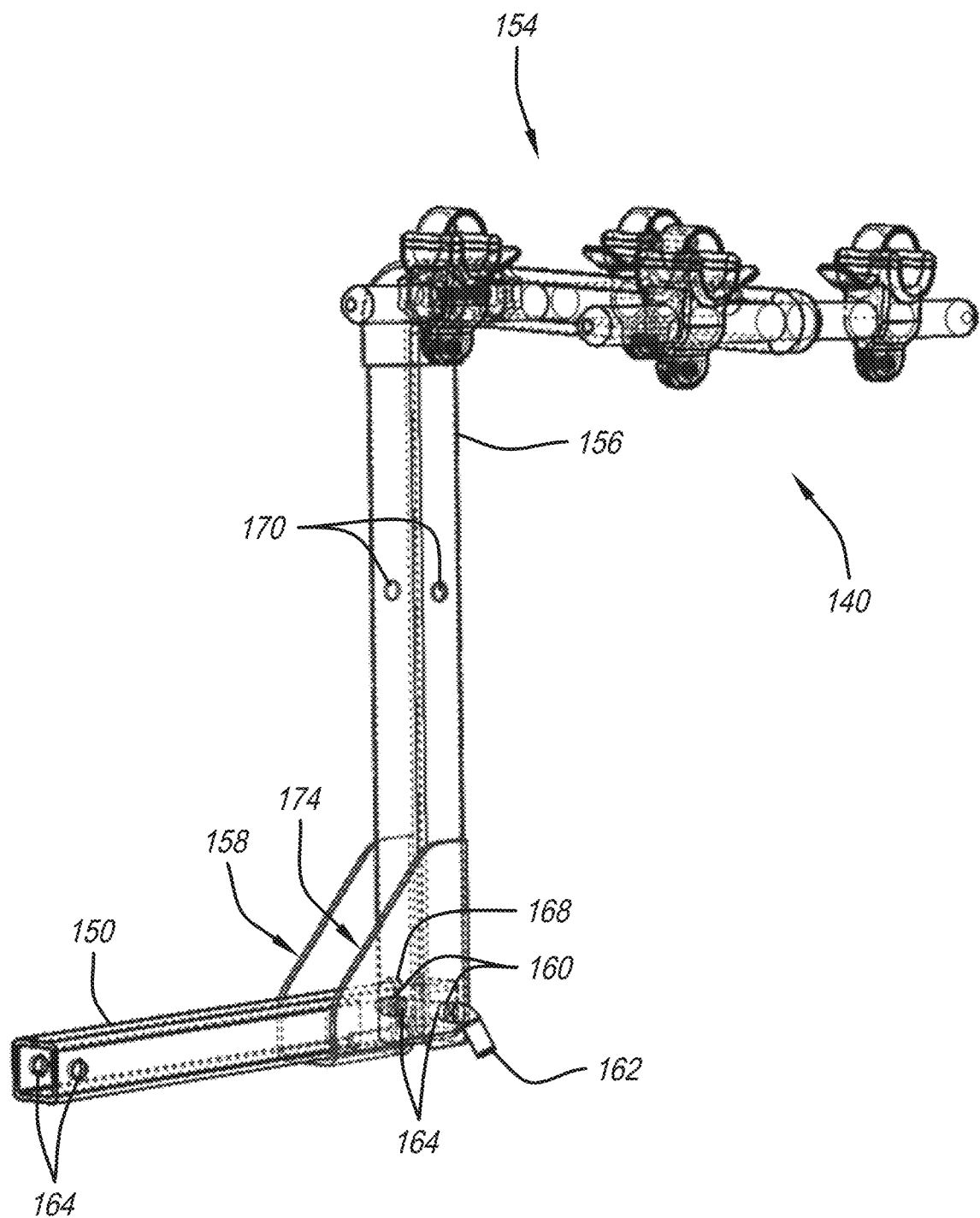
FIG. 33 is another perspective view of the bike rack assembly.
Figure 34:
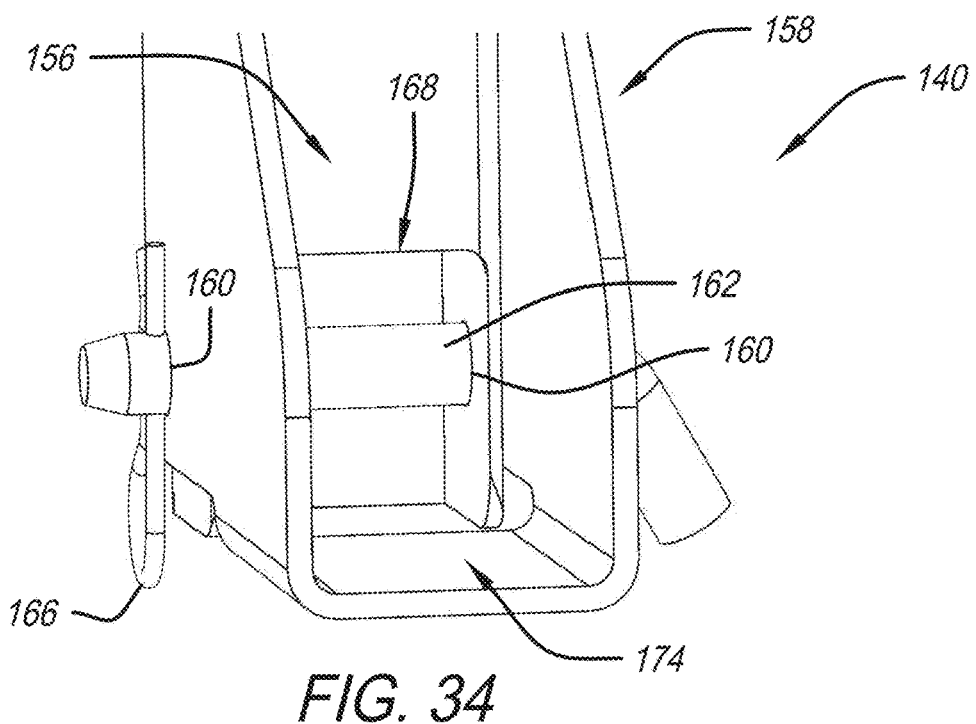
FIG. 34 is a detail perspective view of the support bracket post and base bracket.
Figure 35:
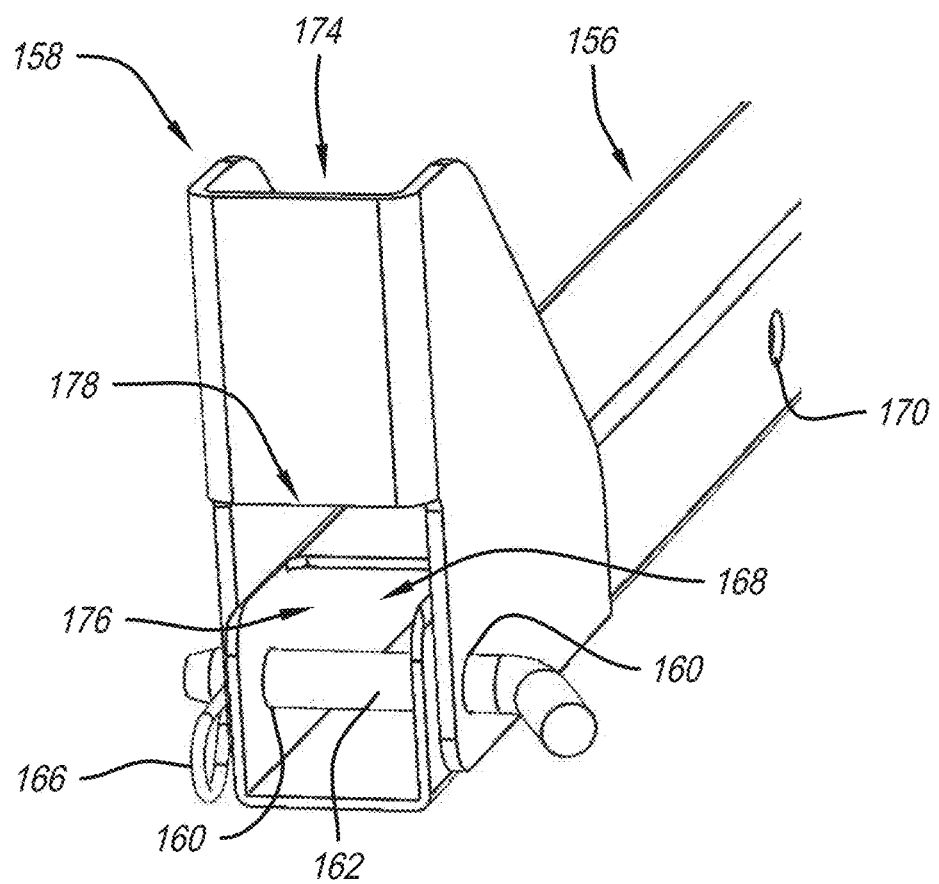
FIG. 35 is an underside detail perspective view of the support bracket post and base bracket.

Perspective views of bike rack assembly 140 are shown in FIGS. 32 and 33. These views differ with respect to how post 146 is positioned with respect to support bracket post 156. For example, in FIG. 32, post 146 is extended within support bracket post 156. Post 146 is illustratively shown in ghost lines when located inside bracket post 156. It is appreciated that support bracket post 156 may be a hollow tube sized to receive post 146. Lock pin 162 is shown disposed through vertical lock pin opening 170 on each side of support bracket post 156, as well as through lock pin openings 164 of post 146. This maintains post 146 at a position that allows it to partially extend from support bracket post 156 as shown. This also allows the lower end of post 146 to extend into a post 146 and to be disposed in deck 16. Another lock pin may extend through lock pin openings 164 that is disposed at the lower end of post 146. This enables bike rack assembly 140 to be secured within post 146.

In contrast, post 146 may be inserted into cut out 168 in support bracket post 156 to extend transverse thereto as shown in FIG. 33. In this configuration, post 146 is cradled in slot 174 formed within base bracket 158 and inserted into support bracket post 156, through cut out 168, as shown until lock pin opening 164 of post 146 aligns with horizontal locking pin openings 160, then disposed through both base bracket 158 and support bracket post 156. This allows lock pin 162 to be disposed through all of lock pin openings 164 and 160 to secure post 146 to support bracket post 156 transverse to same as illustratively shown. In this configuration, post 146 may be fitted into tailgate hitch 148 and secured thereto (see, also, FIG. 27).

Bedslide with Accessories Receivers

A further illustrative embodiment of this disclosure, as discussed previously, are the receivers disposed through the deck of a bedslide. The receivers are configured to receive receiver posts from accessory racks, containers, etc., such as the folding tire rack and bike rack assembly described previously, for example. The number of receivers employed and their placement on the bedslide deck and/or frame, as shown in this disclosure, is illustrative. Any number of receivers may be employed and located in any variety of locations on the bedslide as desired. The modularity of the attachment system allows a quick change of the carrier, rack, etc. from one location to another if that original location was determined not to be satisfactory. Having these simple change options for the location of one or more carriers and racks enhance the utility and versatility of both the bedslide and the carriers and/or racks themselves.

The receivers may be steel tubes or collars that are attached to the frame so as to support the attaching rack structures or carriers. In an illustrative embodiment, when a receiver post is fitted into a receiver on the bedslide, a lock pin can be disposed through both the receiver and the post to secure the carrier, rack, etc. onto the bedslide. It is appreciated that the underside of the bedslide may be accessed to attach or detach the lock pins when the bedslide is pulled out from the cargo box. Additionally, the shape and size of the receivers may be similar for the same as that of tailgate hitches, previously discussed, so that accessory racks, etc., can be attached to either a bedslide deck or tailgate hitch.

Figure 36:
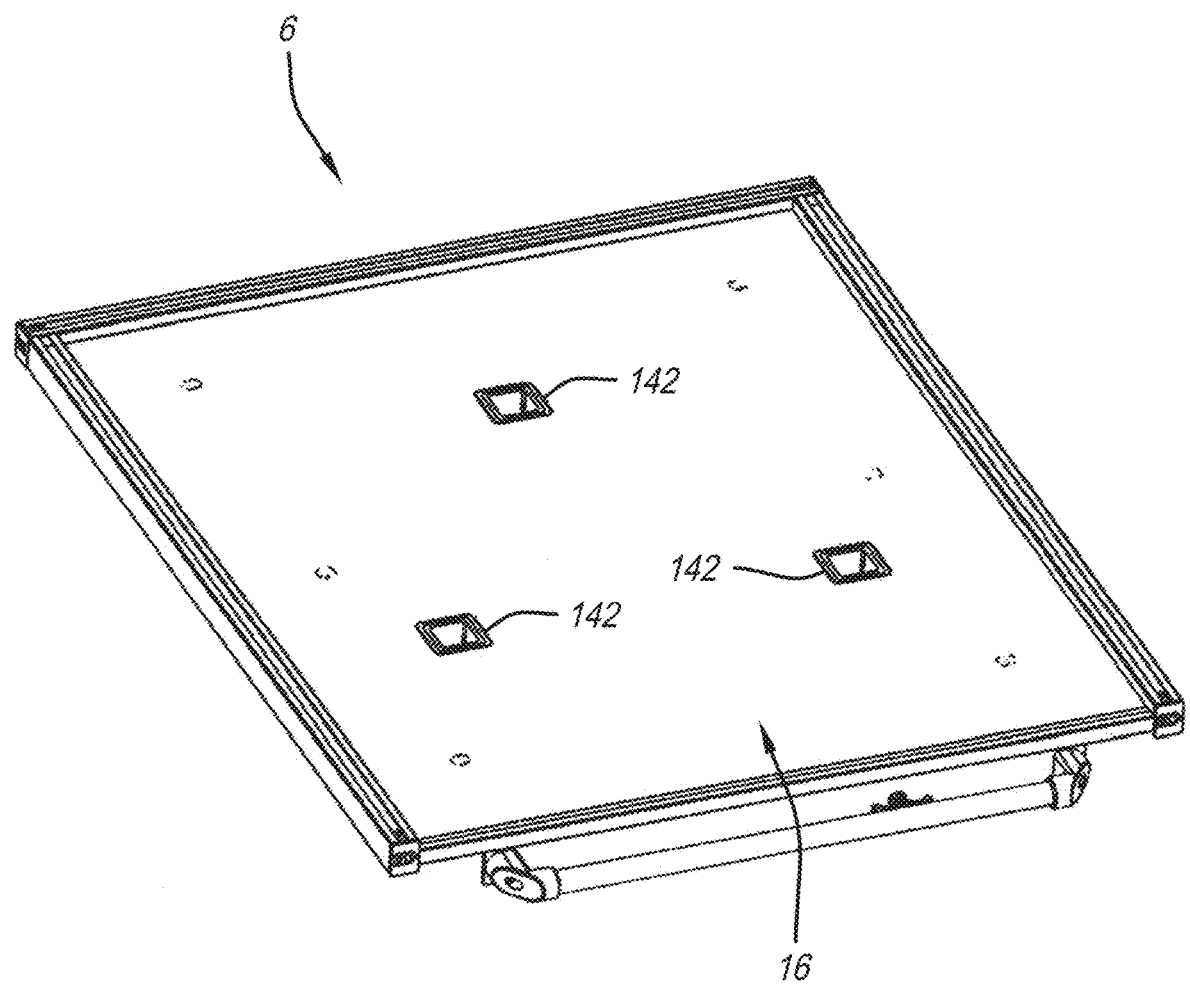
FIG. 36 is a perspective view of a bedslide with a plurality of receivers disposed in its deck.

A perspective view of bedslide 6, with a plurality of receivers 142 disposed through deck 16, is shown in FIG. 36. Each of receivers 142 are spaced apart from each other and represent a location where an accessory rack may be coupled thereto, so long as the accessory rack has a corresponding receiver post such as receiver post 82 or post 146, as disclosed in various embodiments herein. It is appreciated that other accessory racks, tools, containers, etc. may be secured to one or more receivers 142 on deck 16 so long as they have the requisite receiver post. It is further appreciated that the number of receivers 142 and their location on deck 16 is illustrative only. More or less receivers 142 may be disposed through deck 16. If the location of the accessory needs to be different on deck 16, the location of receiver 142 thereon may vary as well. The prior figures of the disclosure herein demonstrate examples of how accessories can be attached to receivers 142 on deck 16.

Figure 37:
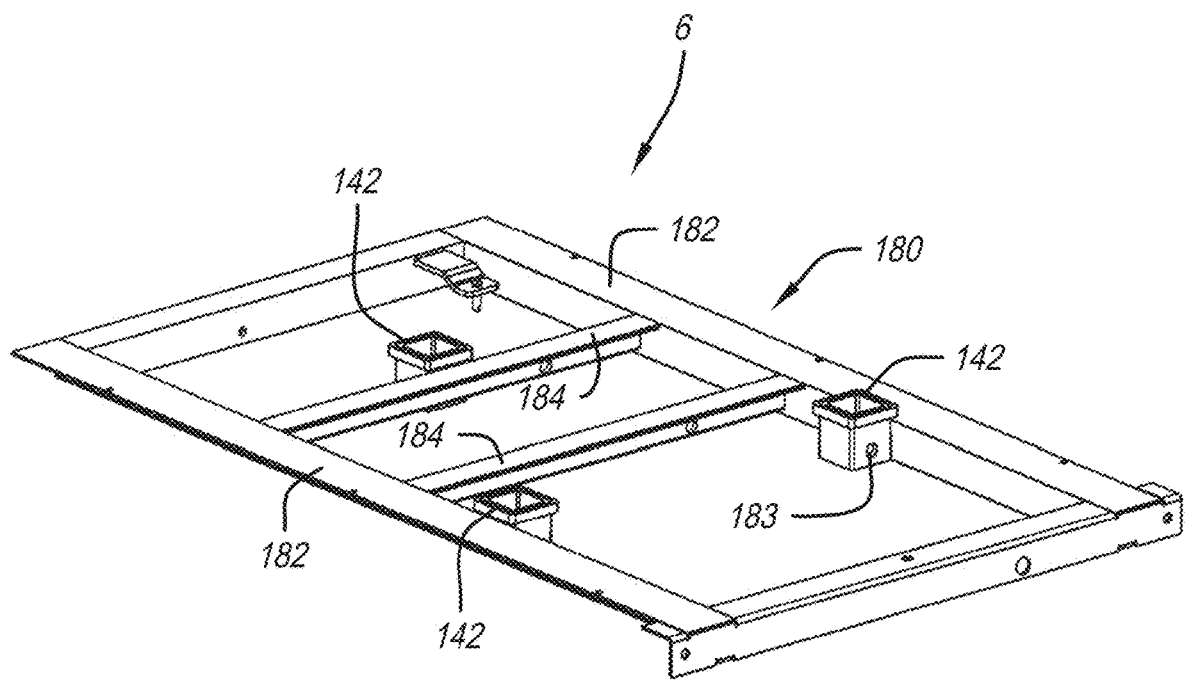
FIG. 37 is a perspective view of the deck frame of a bedslide with receivers attached thereto.

A perspective view of a deck frame 180 of bedslide 6, with receivers 142 attached thereto, is shown in FIG. 37. Here, receivers 142 are shown attached to various components of deck frame 180 including side frame 182 and crossbeams 184. Receivers 142 may be attached to such frame structures to provide them with structural stability. It is appreciated that whether it's tires, bicycles, other structures, significant load may be applied to receivers 142. Being welded or otherwise fastened onto the frame may provide the structural strength to receivers 142 for purposes of supporting the necessary load from the attachments. To that end, receivers 142 may mimic the size and shape of a tailgate hitch, as previously identified in this disclosure, and may be made of a steel alloy or other strong metal so as to carry the needed load from the accessory. As also shown in this view, is locking pin opening 183 which is similar to locking pin opening 172 in tailgate hitch 148 (see, also, FIG. 29).

Figure 38:
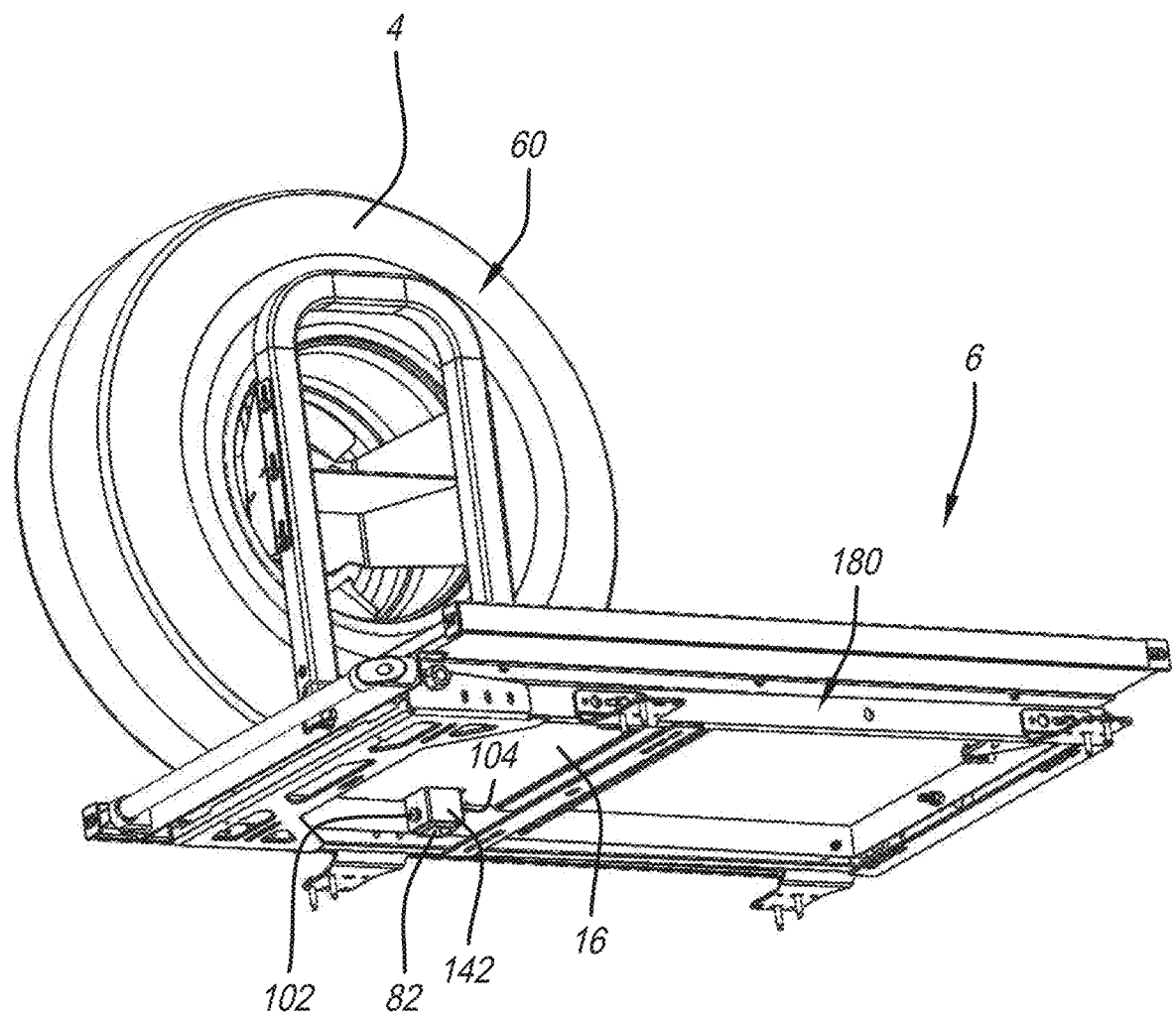
FIG. 38 is an underside perspective view of the bedslide deck with a folding tire carrier attached to a receiver.

For demonstrative purposes, an underside perspective view of bedslide 6, with folding tire carrier 60 attached thereto, is shown in FIG. 38. Here, receiver post 82 is disposed in receiver 148 through deck 16. Securement pin 102 is disposed through locking pin opening 183, as well as through receiver post 82 and secured therein via illustrative cotter pin 104. This arrangement provides positive securement of folding tire carrier assembly 60 onto deck 16 of bedslide 6. It is appreciated that this configuration of receiver 142, with receiver post 82 disposed therethrough, can be replicated at the locations on deck 16, in addition to, or instead of, the embodiments shown herein.

Figure 39:
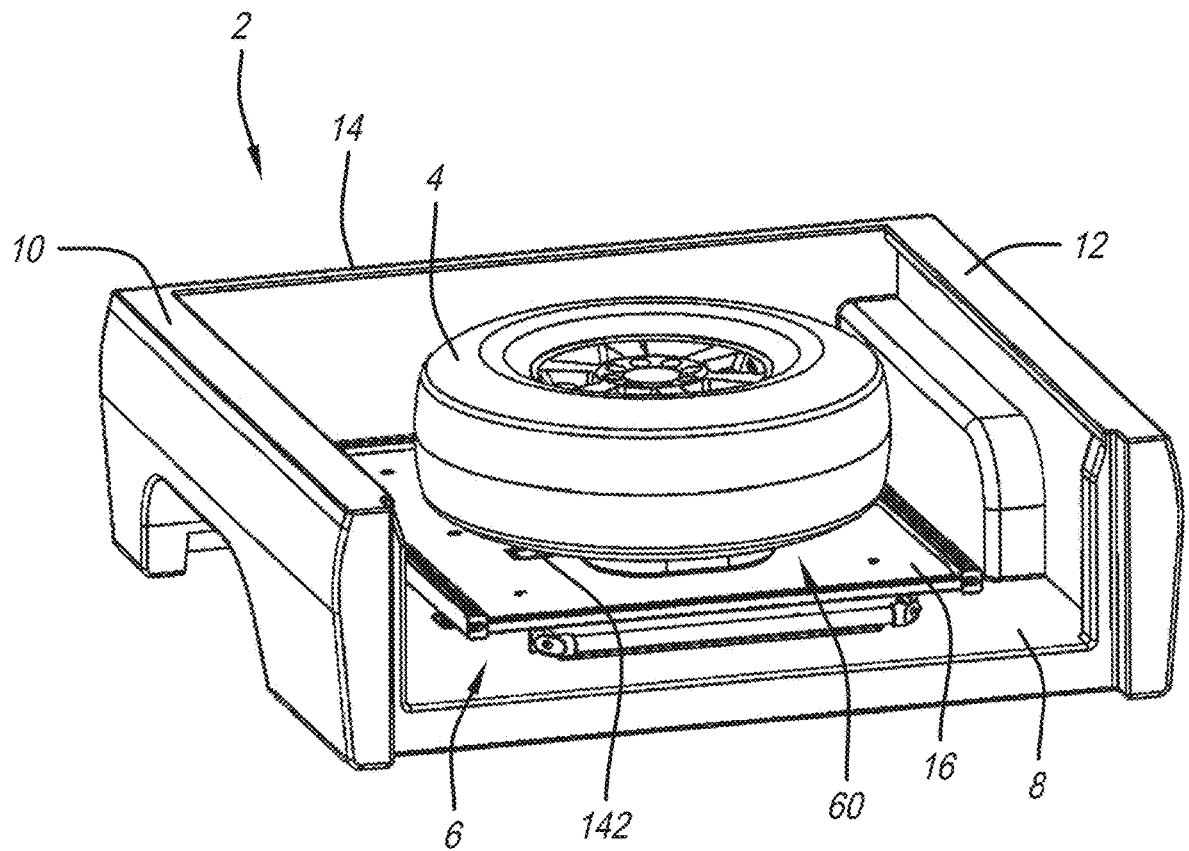
FIG. 39 is a perspective view of the cargo box with a folding tire carrier located in its laid flat position and secured to a bedslide located in its retracted position.
Figure 40:
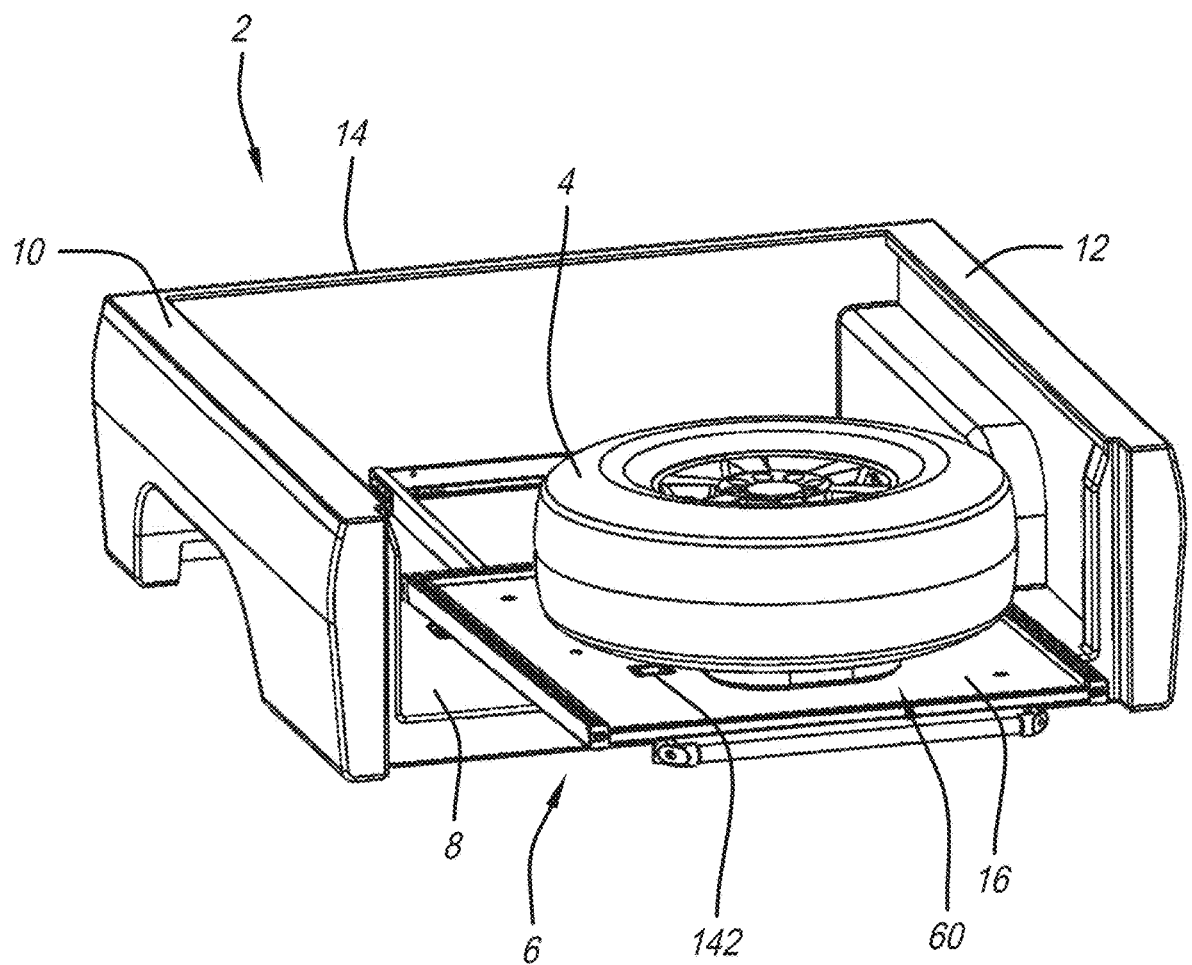
FIG. 40 is another perspective view of the cargo box with a folding tire carrier located in its laid flat position and secured to a bedslide located in its extended position.
Figure 41:
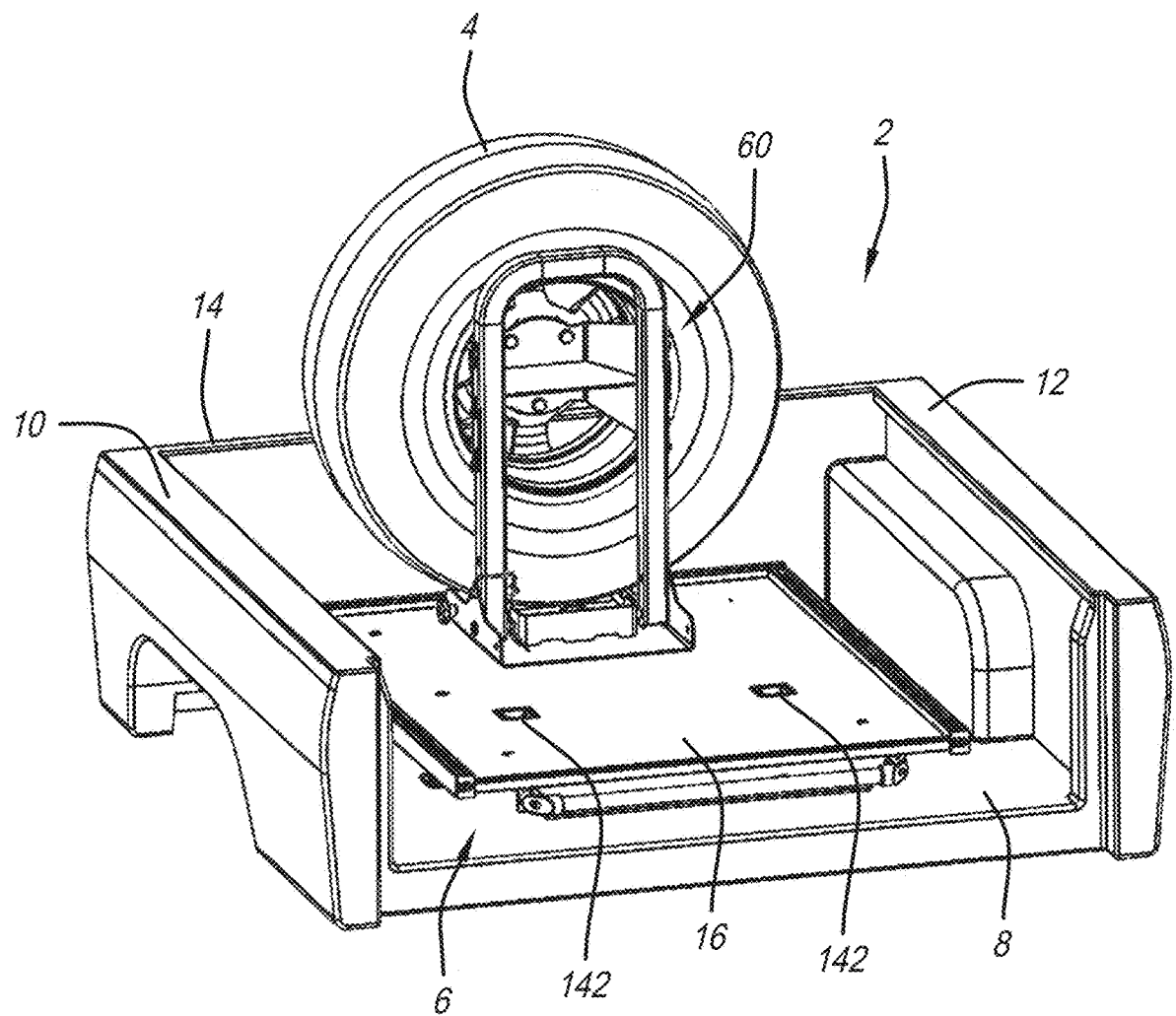
FIG. 41 is another perspective view of the cargo box with a folding tire carrier secured to the bedslide located in its retracted position.
Figure 42:
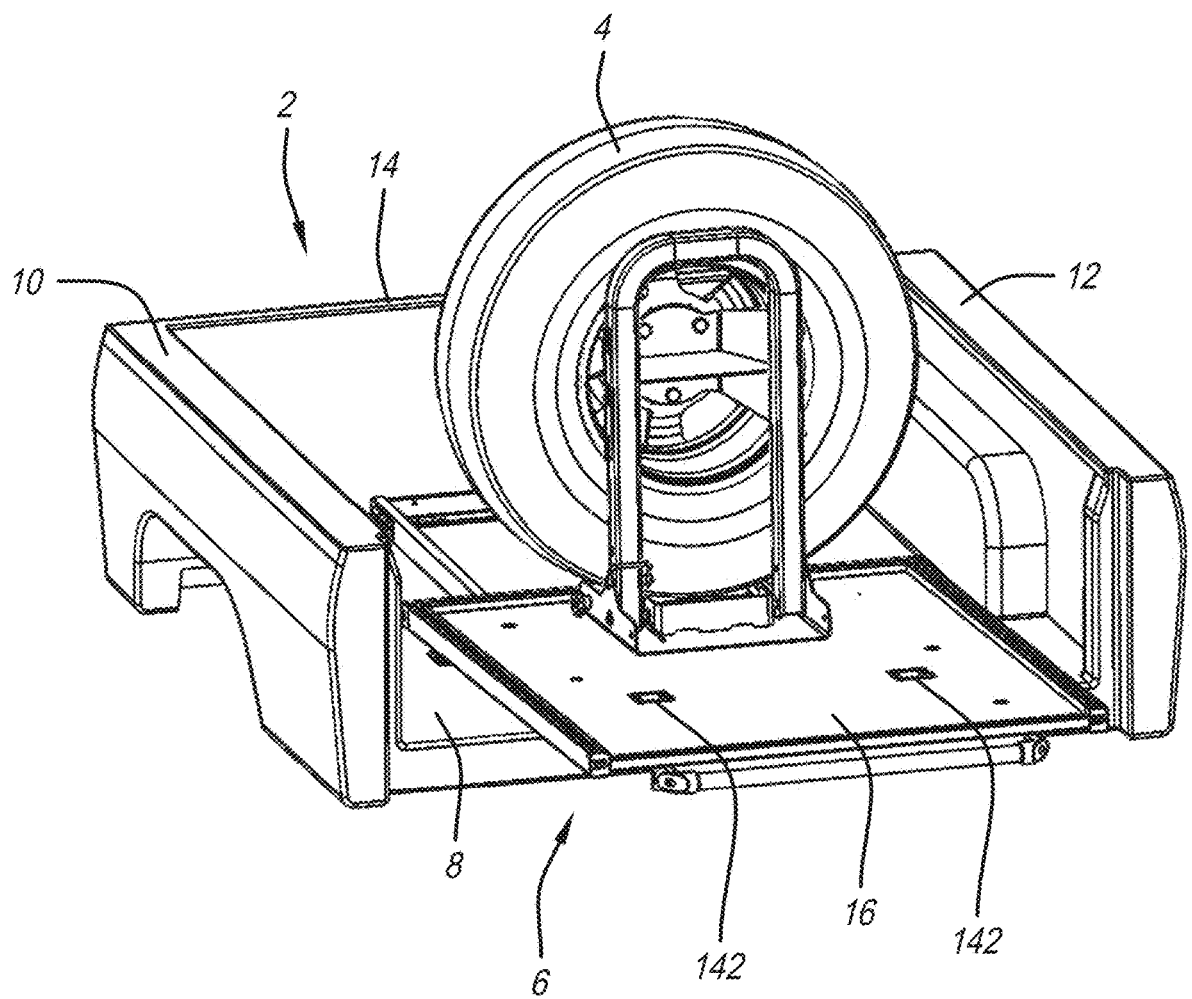
FIG. 42 is another perspective view of the cargo box with a folding tire carrier secured to the bedslide located in its extended position.

Various perspective views of cargo box 2, showing a folding tire carrier assembly 60 on a bedslide 6 in upright and laid flat positions, are shown in FIGS. 39, 40, 41, and 42. The views in FIGS. 39 and 41 show bedslide 6 positioned in its retracted stowed position inside cargo box 2. In FIG. 39, folding tire carrier assembly 60 is shown carrying tire 4 in a laid flat position on deck 16. In contrast, the view shown in FIG. 41 includes folding tire carrier assembly 60 carrying tire 4 in an upright position. The views in FIGS. 40 and 42 are similar to that of FIGS. 39 and 41 except that bedslide 6 has been moved to its extended use position from cargo box 2. Regardless of whether a bedslide 6 is extended or retracted with respect to cargo box 2, folding tire carrier assembly 60 can be attached to a receiver and positioned in either its laid flat or upright position.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed:
1. A tire carrier assembly comprising:
   a tire carrier support bracket;
   a base bracket;
   at least one pivot pin disposed through the base bracket and the tire carrier support bracket to allow the tire carrier support bracket to pivot between upright and laid flat positions with respect to the base bracket;
   a tire carrier attached to the tire carrier support bracket, the tire carrier includes:
      a first sidewall panel and a second sidewall panel at least a portion of which is spaced apart from the first sidewall panel;
      a rim panel located between the first sidewall panel and the second sidewall panel;
      a support panel located between the first sidewall panel and the second sidewall panel and adjacent the rim panel; and
      at least one lug attached to the rim panel;
   at least one foot member that extends transverse from the tire carrier support bracket;
   a lock pin that is selectively extendable through the base bracket and the tire carrier support bracket to prevent the tire carrier support bracket from moving between upright and laid flat positions unless the lock pin is removed from at least the tire carrier support bracket; and a secondary lock fastener that is selectively extendable through the base bracket and the at least one foot member to prevent the tire carrier support bracket from moving from its upright position and is selectively extendable through the base bracket and the tire carrier support bracket to prevent the tire carrier support bracket from moving from its laid flat position.

2. The tire carrier assembly of claim 1, wherein a bail is coupled to the lock pin to assist in selectively securing the lock pin with the base bracket and the tire carrier support bracket.

3. The tire carrier assembly of claim 1, further comprising a spring in engagement with the at least one pivot pin to bias the tire carrier support bracket to its upright position.

4. The tire carrier assembly of claim 1, further comprising a receiver post that extends from the base bracket.

5. The tire carrier assembly of claim 1, further comprising at least one bushing surrounding at least a portion of the at least one pivot pin.

6. The tire carrier assembly of claim 1, wherein the secondary lock fastener is a threaded fastener to selectively engage a corresponding threaded bore located in a structure selected from the group consisting of the at least one foot member and the tire carrier support bracket.

7. The tire carrier assembly of claim 6, wherein the secondary lock fastener is disposed through a first opening in the base bracket when engaged with the corresponding threaded bore located in the at least one foot member or is disposed through a second opening in the base bracket spaced apart from the first opening in the base bracket when engaged with the corresponding threaded bore located in the tire carrier support bracket.

8. The tire carrier assembly of claim 1, wherein the tire carrier support bracket includes a first leg member and a second leg member a portion of which is spaced apart from the first leg member.

9. The tire carrier assembly of claim 8, wherein the at least one foot member extends from the first leg member of the tire carrier support bracket and a second foot member extends transversely from the second leg member.

10. The tire carrier assembly of claim 1, wherein the tire carrier is selectively detachable from the tire carrier support bracket.

11. The tire carrier assembly of claim 8, further comprising a second pivot pin that engages the base bracket and the second leg member of the tire carrier support bracket.

12. A tire carrier assembly comprising:
a tire carrier support bracket;
a base bracket;
at least one pivot pin disposed through the base bracket and the tire carrier support bracket to allow the tire carrier support bracket to move with respect to the base bracket;
a tire carrier attached to the tire carrier support bracket;
a lock pin that is selectively extendable through the base bracket and the tire carrier support bracket to prevent the tire carrier support bracket from moving unless the lock pin is removed from at least the tire carrier support bracket;
at least one foot member that extends transverse from the tire carrier support bracket; and
a secondary lock fastener selectively extendable through the base bracket and the at least one foot member to prevent the tire carrier support bracket from moving.

13. The tire carrier assembly of claim 12, wherein the secondary lock fastener is disposed through a first opening in the base bracket when engaged with a first corresponding threaded bore located in the at least one foot member.

14. The tire carrier assembly of claim 12, wherein the at least one pivot pin is disposed through the base bracket and the tire carrier support bracket to allow the tire carrier support bracket to pivot between upright and laid flat positions with respect to the base bracket.

15. The tire carrier assembly of claim 12, wherein the tire carrier includes: a first sidewall panel and a second sidewall panel at least a portion of which is spaced apart from the first sidewall panel, a rim panel located between the first sidewall panel and the second sidewall panel, a support panel located between the first sidewall panel and the second sidewall panel and adjacent the rim panel, and at least one lug attached to the rim panel.

16. A tire carrier assembly comprising:
a tire carrier support bracket;
a base bracket;
wherein the tire carrier support bracket is movable with respect to the base bracket;
a tire carrier attached to the tire carrier support bracket;
a first lock pin and a secondary lock pin;
wherein the first lock pin is selectively extendable through the base bracket and the tire carrier support bracket to prevent the tire carrier support bracket from moving between upright and laid flat positions;
at least one foot member that extends transverse from the tire carrier support bracket;
a secondary lock fastener selectively extendable through the base bracket and the at least one foot member to prevent the tire carrier support bracket from moving; and
a receiver post that extends from the base bracket.

17. The tire carrier assembly of claim 16, wherein the receiver post is sized to fit in a receiver disposed through a bedslide deck.

* * * * *